US008990106B2

(12) United States Patent
Parker et al.

(10) Patent No.: US 8,990,106 B2
(45) Date of Patent: Mar. 24, 2015

(54) INFORMATION CATEGORISATION SYSTEMS, MODULES, AND METHODS

(75) Inventors: Adam Parker, Newcastle upon Tyne (GB); Jonathan Dolby, Lincoln (GB); Matthew Stead, Lincoln (GB)

(73) Assignee: Realwire Limited, Newcastle Upon Tyne (GB)

( * ) Notice: Subject to any disclaimer, the term of this patent is extended or adjusted under 35 U.S.C. 154(b) by 10 days.

(21) Appl. No.: 13/032,035

(22) Filed: Feb. 22, 2011

(65) Prior Publication Data

US 2012/0143965 A1 Jun. 7, 2012

Related U.S. Application Data

(63) Continuation-in-part of application No. PCT/GB2009/051048, filed on Aug. 24, 2009.

(51) Int. Cl.
  *G06Q 30/00* (2012.01)
  *G06Q 10/00* (2012.01)
  *G06Q 30/02* (2012.01)

(52) U.S. Cl.
  CPC .......... *G06Q 10/00* (2013.01); *G06Q 30/0269* (2013.01)
  USPC ...................................................... 705/14.66

(58) Field of Classification Search
  CPC .................................. G06Q 30/0242–30/0271
  USPC .............................. 705/14.49–14.67; 709/206
  See application file for complete search history.

(56) References Cited

U.S. PATENT DOCUMENTS

| 5,754,939 | A | * | 5/1998 | Herz et al. | .................. | 455/3.04 |
| 6,182,063 | B1 | * | 1/2001 | Woods | .......................... | 707/722 |
| 6,645,068 | B1 | * | 11/2003 | Kelly et al. | ..................... | 463/9 |
| 7,958,228 | B2 | * | 6/2011 | Riise et al. | .................... | 709/224 |
| 8,160,615 | B1 | * | 4/2012 | Barnes et al. | ............. | 455/456.3 |
| 8,172,683 | B2 | * | 5/2012 | Kelly | ............................ | 463/42 |

(Continued)

FOREIGN PATENT DOCUMENTS

| WO | 01/27829 A | 4/2001 |
| WO | 2007/142435 A | 12/2007 |

OTHER PUBLICATIONS

International Search Report for Application No. PCT/GB2009/051048 mailed Nov. 30, 2009.

(Continued)

*Primary Examiner* — Lance L Barry
(74) *Attorney, Agent, or Firm* — Carter, DeLuca, Farrell & Schmidt, LLP

(57) ABSTRACT

An information categorization system comprising: a potential recipient output harvesting module configured to harvest information content generated by a potential recipient; a potential recipient profile generation module configured to generate a recipient profile representing one or more likely interests of the potential recipient; a comparison module adapted to receive an information content profile representative of content of information content to be categorized and, in response to receipt of the information content profile, to compare the information content profile with the recipient profile to determine a match indicating the potential recipient is likely to be interested in the information content; and an information categorization module configured to categorize the information content into information content for which the comparison module has either determined or failed to determine a match between the information content profile and the recipient profile.

21 Claims, 27 Drawing Sheets

(56) References Cited

U.S. PATENT DOCUMENTS

| | | | |
|---|---|---|---|
| 8,280,906 B1* | 10/2012 | Lillibridge et al. | 707/784 |
| 2001/0014868 A1* | 8/2001 | Herz et al. | 705/14 |
| 2002/0010747 A1 | 1/2002 | Jaehyuk-Hwang | |
| 2002/0042731 A1* | 4/2002 | King et al. | 705/10 |
| 2002/0152117 A1* | 10/2002 | Cristofalo et al. | 705/14 |
| 2002/0156638 A1* | 10/2002 | Guedri et al. | 705/1 |
| 2003/0033301 A1 | 2/2003 | Cheng et al. | |
| 2006/0026113 A1* | 2/2006 | Omoigui | 706/55 |
| 2008/0015878 A1* | 1/2008 | Feng et al. | 705/1 |
| 2008/0199042 A1* | 8/2008 | Smith | 382/100 |
| 2009/0172728 A1* | 7/2009 | Shkedi et al. | 725/34 |
| 2009/0271309 A1* | 10/2009 | Gordon et al. | 705/37 |
| 2009/0327040 A1* | 12/2009 | McInerny | 705/10 |
| 2010/0049770 A1* | 2/2010 | Ismalon | 707/765 |
| 2011/0041153 A1* | 2/2011 | Simon et al. | 725/46 |
| 2011/0282733 A1* | 11/2011 | Gnanasambandam et al. | 705/14.44 |
| 2012/0136723 A1* | 5/2012 | Larner et al. | 705/14.54 |

OTHER PUBLICATIONS

European Search Report for Application No. EP 09 16 8495 mailed Nov. 17, 2009.

Chevalier et al, "Personalized Information Access Through Flexible and Interoperable Profiles", v. 4832, Dec. 2007, pp. 374-385.

European Search Report dated Jun. 4, 2012 from EP Application No. 09168495.1 (6 pgs.).

European Search Report dated Feb. 21, 2013 from EP Application No. 09168495.1 (5 pgs).

\* cited by examiner

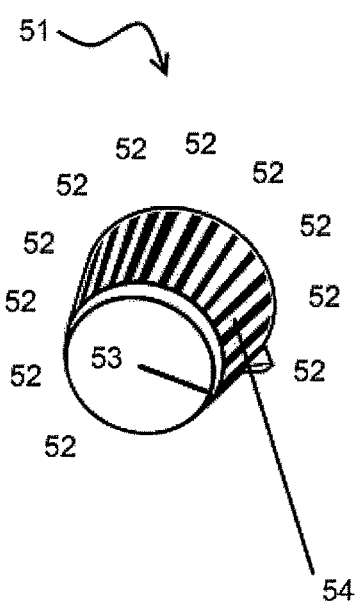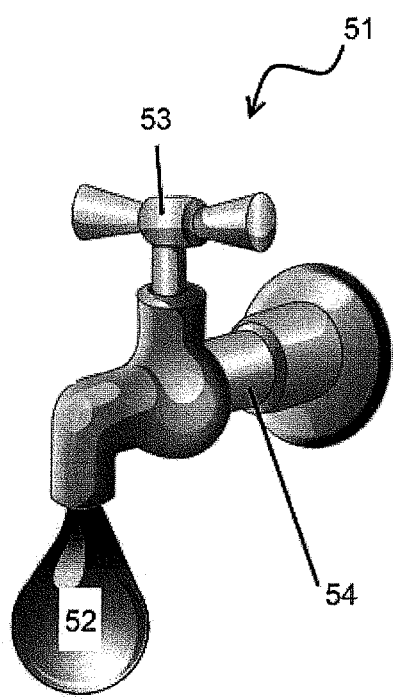
Figure 12b                    Figure 12c

57

Boilerplate

71

Release Summary

72

SEO Keywords

73

INFORMATION CATEGORISATION SYSTEMS, MODULES, AND METHODS

TECHNICAL FIELD

The present invention relates to systems, components of systems (such as modules) and methods generally associated with the generation of a recipient profile, the categorisation of information using a recipient profile, and the filtration of information using a recipient profile.

BACKGROUND

Modern electronic communication systems, such as email, have dramatically decreased the costs associated with the distribution of information. As a consequence, the volume of information distributed by modern communication systems has increased significantly. It is now common for a single communication to be transmitted to many thousands (if not millions) of potentially interested recipients.

Distribution lists of contact details (such as email addresses) for recipients interested in particular types of information are now a valuable commodity. These lists may be purchased by content generators and used to target specific sub-sets of potential recipients who are likely to be interested in the information being generated. Alternatively, a content generator may submit information to a distributor and the distributor (who holds the distribution list) may then transmit the information to the potentially interested recipients listed in the distribution list on behalf of the content generator.

For example, a clothing company which will shortly launch a new line of clothing may generate an article announced in the launch. The company submits this article to a distributor who transmits the article, by email for example, to potentially interested recipients listed in a distribution list of recipients who may be interested in the content of that article (e.g. recipients interested in fashion).

This conventional process is, however, flawed.

The distribution lists are often rated on the number of potentially interested recipients listed. Thus, compilers of the distribution lists are inclined to pad the lists with recipients who may, in fact, have little interest in the relevant type of information content.

The distribution list compilers have little motivation to provide quality control for the distribution lists which they produce—for example, the users of the distribution lists may not be the list compliers. Thus, even if individual users provide feedback in response to received information, that feedback does not typically filter back to the list compilers or they may not choose to act on the feedback which they do receive.

Moreover, there is often no mechanism by which the recipients can provide feedback to the distribution list compiler regarding their interests.

Thus, turning back to the article generated by the clothing company, the article may be sent to the journalists at a magazine with a fashion column—these journalists were listed in the distribution list because of the magazine's fashion column. However, a number of those journalists may not be involved in the production of the fashion column of the magazine but may be involved in the production of a food column (for example). Thus, these journalists—who have no interest in the content of the article—will ignore and/or delete the article when it is received.

The fashion company may have selected a particular distributor because of a claim by the distributor regarding the size of the distribution list (and hence the number of recipients) to which that distributor has access. If, however, only 25% of the potentially interested recipients listed in the distribution list are actually potentially interested in the article generated by the clothing company, then that clothing company is effectively paying the distributor to distribute their article to a large number of recipients (75% of the allegedly potentially interested recipients) who will not even consider the content of the article and may, instead, simply delete the article.

Thus, the content generator may find that a different distributor—with access to a different and potentially shorter distribution list—would have provided a better service because more of the potential recipients listed in that distributor's distribution list were actually interested in the content of the article. It is, however, currently impossible for the content generator to obtain any reasonable quality measure for a distribution list which includes an accurate estimation of the number of actually interested recipients who can be targeted.

The inexpensive nature of this form of information distribution through modern communication systems has led to a practice among the distributors of information which is effectively a "shot-gun approach" to the distribution of information. This approach relies on information being distributed to a very large number of recipients in the hope that at least some of those recipients are potentially interested in the information being distributed. The collateral damage associated with this approach is that recipients receive vast quantities of information which may be of no or very little interest.

The large number of unnecessary communications being distributed imposes a significant burden on the infrastructure of the modern communication systems which are being used in this manner.

Moreover, a recipient receiving a large quantity of information of little or no interest, is more likely to miss information which is of interest when compared to a recipient who substantially only receives relevant and interesting information.

Simply establishing whether or not a particular piece of information is relevant may consume a large amount of time for a recipient. This is magnified when the recipient receives a multitude of communications each of which contains information which may (potentially) be of interest and which must be reviewed. Cumulatively, the time expended by recipients reviewing communications can consume large quantities of an organisation's resources.

In addition, the trading of distribution lists can be prejudicial to privacy as contact details for potential recipients are passed from distributor-to-distributor, from content generator-to-content generator and/or from list compiler-to-list compiler without the approval of the potential recipients.

One example of a conventional information filtration system is an unsolicited bulk email filter (a "SPAM filter"). A typical SPAM filter is configured to identify unsolicited bulk email based on information about the transmitter of the email. For example, the internet protocol (IP) address of the sender of an email may be traced by a SPAM filter and the information provided by that trace used by the SPAM filter to determine (within a degree of likelihood) whether or not the email is, in fact, an unsolicited bulk email (i.e. SPAM).

SPAM filtration systems are, however, limited because they identify email as either (i) legitimate or (ii) unsolicited—and unwanted—email. The SPAM filter does not allow for the possibility of one recipient protected by the SPAM filter being interested in the email and another recipient protected by the SPAM filter not being interested in the email. Instead, the SPAM filter applies the same criteria to each email irrespective of the particular interests of the recipient. In other words, SPAM filters typically have no regard for the content of the emails which they are filtering (which may actually be of interest to a recipient).

In the case of the distribution of legitimate information, an information distributor is a legitimate source of information for recipients and a SPAM filter, unless configured by the user to reject all communications from an information distributor, will allow communications from an information distributor irrespective of the information content.

SPAM filters, therefore, provide a coarse email filtration system but are incapable of handling more advanced filtration tasks.

The problems with the prior art are especially prevalent in the field of public relations and in the media industry.

The present invention, therefore, seeks to ameliorate one or more of the problems associated with the prior art.

SUMMARY

Accordingly, one aspect of the present invention provides an information categorisation system comprising: a potential recipient output harvesting module configured to harvest information content generated by a potential recipient; a potential recipient profile generation module configured to generate a recipient profile representing one or more likely interests of the potential recipient, the one or more likely interests being determined by the harvested information content; a comparison module adapted to receive an information content profile representative of content of information content to be categorised and, in response to receipt of the information content profile, to compare the information content profile with the recipient profile to determine a match indicating that the potential recipient is likely to be interested in the information content; and an information categorisation module configured to categorise the information content into information content for which the comparison module has determined a match between the information content profile and the recipient profile and information content for which the comparison module has failed to determine a match between the information content profile and the recipient profile.

Preferably, the information categorisation module is further configured to transmit the information content for which the comparison module has determined a match between the information content profile and the recipient profile to the potential recipient with an indicator indicating that a match was determined.

Alternatively, the information categorisation module is further configured to transmit only the information content for which the comparison module has determined a match between the information content profile and the recipient profile to the potential recipient.

Alternatively, the information categorisation module is further configured to present the information content for which the comparison module has determined a match between the information content profile and the recipient profile to the potential recipient with an indicator indicating that a match was determined.

Preferably, the information categorisation module is further configured to present only the information content for which the comparison module has determined a match between the information content profile and the recipient profile to the potential recipient.

Conveniently, the system further comprises a database containing a plurality of recipient profiles each recipient profile representing one or more likely interests of a respective potential recipient, wherein the comparison module is adapted to compare the information content profile with each of the plurality of recipient profiles and the information categorisation module is configured to categorise the information content independently for the or each potential recipient whose recipient profile matches the information content profile.

Advantageously, the recipient profile generation module is adapted to identify one or more terms and/or phrases in the harvested information content and provide a score for at least one of the terms and/or phrases which is dependent on the frequency of occurrence and location of the term and/or phrase in the harvested information content, the or each score being stored in the recipient profile with the associated term and/or phrase.

Preferably, the harvested information content comprises a plurality of harvested information content documents and the frequency of occurrence of the term and/or phrase in the harvested information content includes the frequency of occurrence of the term throughout the plurality of harvested information content documents.

Conveniently, the comparison module is adapted to receive an information content profile comprising at least one term and/or phrase and an associated score for the or each term and/or phrase, and the comparison module is further adapted to compare the information content profile score and the recipient profile score for a common term and/or phrase with a threshold value.

Advantageously, the comparison module is adapted to multiply the information content profile score and the recipient profile score for the common term and/or phrase to provide a receiver release score, and to compare the receiver release score with a threshold value which is a portion of the total of all the scores in the recipient profile.

Preferably, the portion of the total of all the scores in the recipient profile which forms the threshold value is set by a recipient adjustable relevance threshold.

Conveniently, the system further comprises a relevance threshold module configured to provide a recipient with an input mechanism to adjust a recipient adjustable relevance threshold, the recipient adjustable relevance threshold being used by the comparison module to determine whether or not a match is sufficient to indicate that the recipient is likely to be interested in the information content.

Advantageously, the system further comprises an information content profile generation module which is adapted to identify one or more terms and/or phrases in the information content and provide a score for at least one of the terms and/or phrases which is dependent on the frequency of occurrence and location of the term and/or phrase in the information content, the or each score being stored in the information content profile with the associated term and/or phrase.

Preferably, further comprises an information content categorisation coverage prediction module which is configured to receive data from the comparison module regarding matches which the comparison module has identified and to output the data in advance of the categorisation module categorising the information content.

Preferably, the system further comprises a recipient feedback module configured to receive feedback from a recipient who in response to the information content for which the comparison module has determined a match between the information content profile and the recipient profile, and to update the recipient profile for that recipient based on the feedback.

Conveniently, the feedback module is further configured to adjust the content of one or more lists of terms and/or phrases in the recipient profile, the one or more lists being used by the comparison module.

Advantageously, the system further comprises an anti-abuse module which is configured to receive information content to be categorised and to analyse the information content and quarantine information in which: the terms and/or phrases used in the information content are repeated more than a predetermined number of times, and/or there are fewer than a predetermined number of unique terms and/or phrases used in the information content, and/or the terms and/or phrases in the information content are listed in a banned term/phrase list.

Preferably, the system further comprises a usage monitoring module configured to monitor output information content generated by a recipient in response to information content for which the comparison module has determined a match between the information content profile and the recipient profile to determine whether the recipient uses the information content in the generation of output information content.

Conveniently, the system further comprises a comparison adjustment module configured to adjust one or more parameters of the comparison module based on usage information output by the usage monitoring module to refine the comparison process of the comparison module.

Advantageously, the system further comprises an information content submission module adapted to rate and output the quality of the information content.

Preferably, the system further comprises an information content submission module adapted to rate and output a predicted coverage of the categorised information content.

Conveniently, the comparison module is configured to compare an industry category of the information content profile with an industry category of the recipient profile to determine a match indicating that the potential recipient is likely to be interested in the information content.

Advantageously, the system further comprises an information content profile generation module which is adapted to identify one or more terms and/or phrases in the information content and provide a score for at least one of the terms and/or phrases which is dependent on the frequency of occurrence and location of the term and/or phrase in the information content, the or each score being stored in the information content profile with the associated term and/or phrase.

Preferably, the information content profile generation module is further adapted to receive an industry profile comprising at least one term and/or phrase and an associated score for the or each term and/or phrase, and to compare the industry profile score and the information content profile score for a common term and/or phrase with a threshold value.

Advantageously, the information content profile generation module is adapted to multiply the information content profile score and the industry profile score for the common term and/or phrase to provide an industry release score, and to compare the industry release score with a threshold value which is a portion of the total of all the scores in the industry profile.

Conveniently, the potential recipient input harvesting module is configured to harvest information content generated by a potential recipient and output in an information feed associated with the potential recipient.

Preferably, the information feed is a RSS or Atom feed.

Advantageously, the information categorisation module is further configured to send the information content to the potential recipient in the event of the comparison module determining a match between the information content profile and the recipient profile by transferring or copying the information content into a first information storage location.

Conveniently, the information categorisation module is further configured to transfer or copy the information content into a second information storage location in the event of the comparison module failing to determine a match between the information content profile and the recipient profile.

Preferably, the modules form part of a computer program operating on a computer.

Another aspect of the present invention provides a computer implemented method comprising: harvesting information content generated by a potential recipient in a potential recipient output harvesting module; generating, in a potential recipient profile generation module, a recipient profile representing one or more likely interests of the potential recipient, the one or more likely interests being determined by the harvested information content; receiving, in a comparison module, an information content profile representative of content of information content to be categorised and, in response to receipt of the information content profile, comparing the information content profile with the recipient profile to determine a match indicating that the potential recipient is likely to be interested in the information content; and categorising, using an information categorisation module, the information content into information content for which the comparison module has determined a match between the information content profile and the recipient profile and information content for which the comparison module has failed to determine a match between the information content profile and the recipient profile.

Another aspect of the present invention further provides a system configured to generate a recipient profile, the system comprising: a potential recipient output harvesting module configured to receive location information from a potential recipient, the location information representing the location of information content generated by the potential recipient and to harvest at least a portion of the information content; and a potential recipient profile generation module configured to generate a recipient profile representing one or more likely interests of the potential recipient, the one or more likely interests being determined by the harvested information content.

Preferably, the location information comprises a location of an information feed.

Advantageously, the information feed is a RSS or Atom feed.

Conveniently, the location information further comprises a location of one or more emails.

Preferably, the one or more emails are stored in the system and the location information comprises a location of the one or more emails in the system.

Advantageously, the information content is harvested passively.

Another aspect of the present invention provides a computer implemented method to generate a recipient profile, the method comprising: receiving location information from a potential recipient, the location information representing the location of information content generated by the potential recipient; harvesting, in a potential recipient output harvesting module, at least a portion of the information content; and generating, in a potential recipient profile generation module, a recipient profile representing one or more likely interests of the potential recipient, the one or more likely interests being determined by the harvested information content.

Preferably, receiving location information comprises receiving a location of an information feed.

Advantageously, receiving location information comprises receiving a location of a RSS or Atom feed.

Conveniently, receiving location information further comprises receiving a location of one or more emails.

Preferably, the one or more emails are stored in the system and receiving the location information comprises receiving a location of the one or more emails in the system.

Advantageously, harvesting comprises harvesting the information content harvested passively.

Another aspect of the present invention provides a computer readable medium having stored thereon a computer program which, when run on a computer, causes the computer to operate in accordance with any of the methods above.

Another aspect of the present invention provides a computer readable medium having stored thereon a database including a plurality of recipient profiles, each associated with a potential recipient and each comprising one or more terms and/or phrases used in information content output by the associated potential recipient and a score for at least one of the terms and/or phrases which is dependent on the frequency of occurrence and location of the term and/or phrase in the harvested information content, such that each recipient profile can be used to determine the likely interests of the associated recipient.

BRIEF DESCRIPTION OF THE DRAWINGS

Embodiments of the present invention will now be described, by way of example, with reference to the accompanying drawings in which.

DETAILED DESCRIPTION

Processes and Systems Overview

Aspects of embodiments seek to use the information which is generated by a potential recipient to provide an insight into the interests and priorities of that potential recipient. This insight may then, in an embodiment, be used to match information content with the interests and priorities of the potential recipient in order to target the delivery of specific information content to that potential recipient.

In addition, where—for example—access to a potential recipient's own information content is limited, or not possible, then the use of proxy data may, in an embodiment, be possible. This proxy data may be derived from another party, group of parties, potential recipient, or group of potential recipients, whose interests and priorities can be assessed (by virtue of information content which they generate—for example) and which are likely to share common interests and priorities with the potential recipient who cannot be directly assessed; for example, they may operate in the same industry as the potential recipient.

An embodiment includes the hierarchical ranking of the match between an information content profile for information to be sent and a recipient profile for a potential recipient, based on the likelihood that the potential recipient is interested in the information content. In an embodiment, the recipient is given control over the matching process so that the degree of match between the information content and the recipient's interests which is required for the information content to be sent to the recipient can be controlled. In other words, the recipient may be given control over the level in the hierarchical ranking which determines what information content is sent to the recipient.

With reference to FIGS. 1 to 7, aspects of embodiments of the present invention are described in brief to provide an overview of these aspects of the invention. The various components of the invention are then described, by way of example, in more detail with reference to the other figures.

Figure 1A:
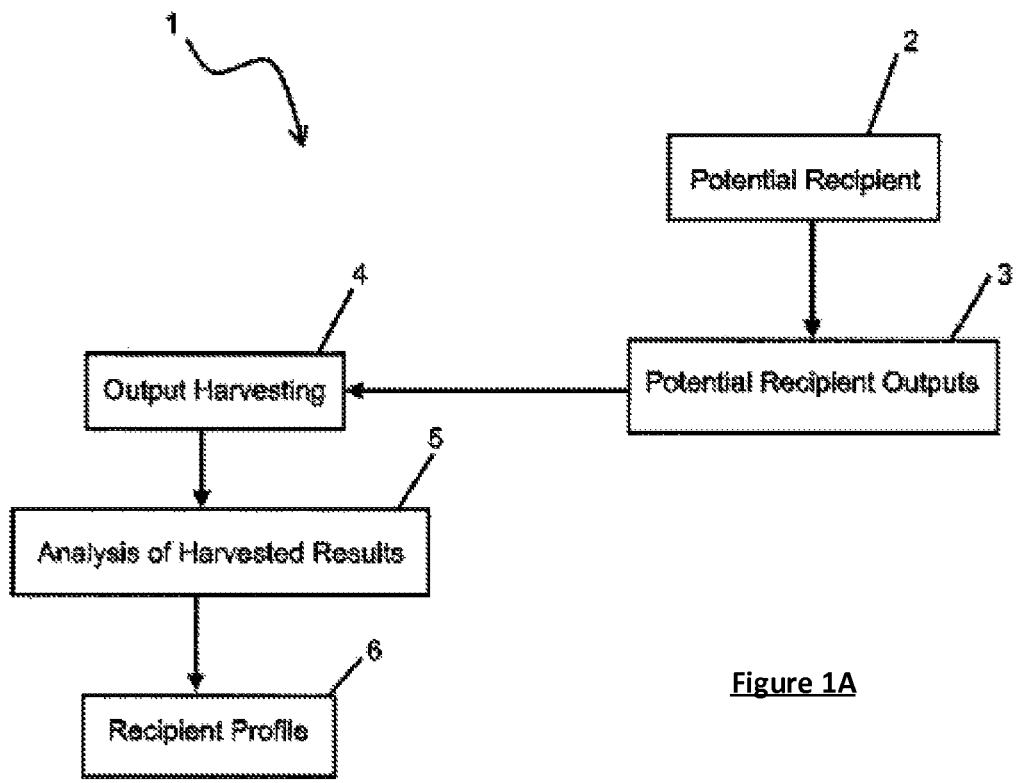
FIG. 1A shows aspects of a recipient profile generation process.

With reference to FIG. 1A, an embodiment comprises a recipient profile generation process 1. In accordance with process 1, information content generated by a potential recipient 2—potential recipient outputs 3—are harvested in an output harvesting process 4 to produce harvested results.

The information content which is generated by the potential recipient 2 and harvested by the output harvesting process 4 may comprise, as is discussed in more detail below, for example RSS feeds or any other form of information content which is generated by the potential recipient 2 or as a result of information content which is generated by the potential recipient 2. Each item of information content (be it an article, a entry in a RSS feed, a webpage, a status update (such as a Tweet), a social networking entry, a microblog entry, blog entry, an email, or the like) is considered to be document. The use of the term "document" herein is to be interpreted accordingly.

The output harvesting process 4 may be a passive process in which the potential recipient 2 is not required to input information content. Instead, the process 4 passively harvests existing information content which is available to it.

In an embodiment, the potential recipient 2 provides location information which is to be used by the output harvesting process 4 to determine the location of the information content to be harvested. This may include a directory on a computer storage medium, a URL, or any other suitable location information.

The harvested results are then analysed 5 to produce a recipient profile 6. This recipient profile 6 is, therefore, a profile 6 based on the information content which is produced by the potential recipient 2 and, hence, is usually a good indication of the interests of the potential recipient 2.

For example, a clothing company may produce information content which discusses changes in fashion, new lines of clothing and the like. It is reasonable to assume that the clothing company is, therefore, interested in information content from content generators which relates to fashion. The recipient profile 6 reflects these interests.

Figure 2:
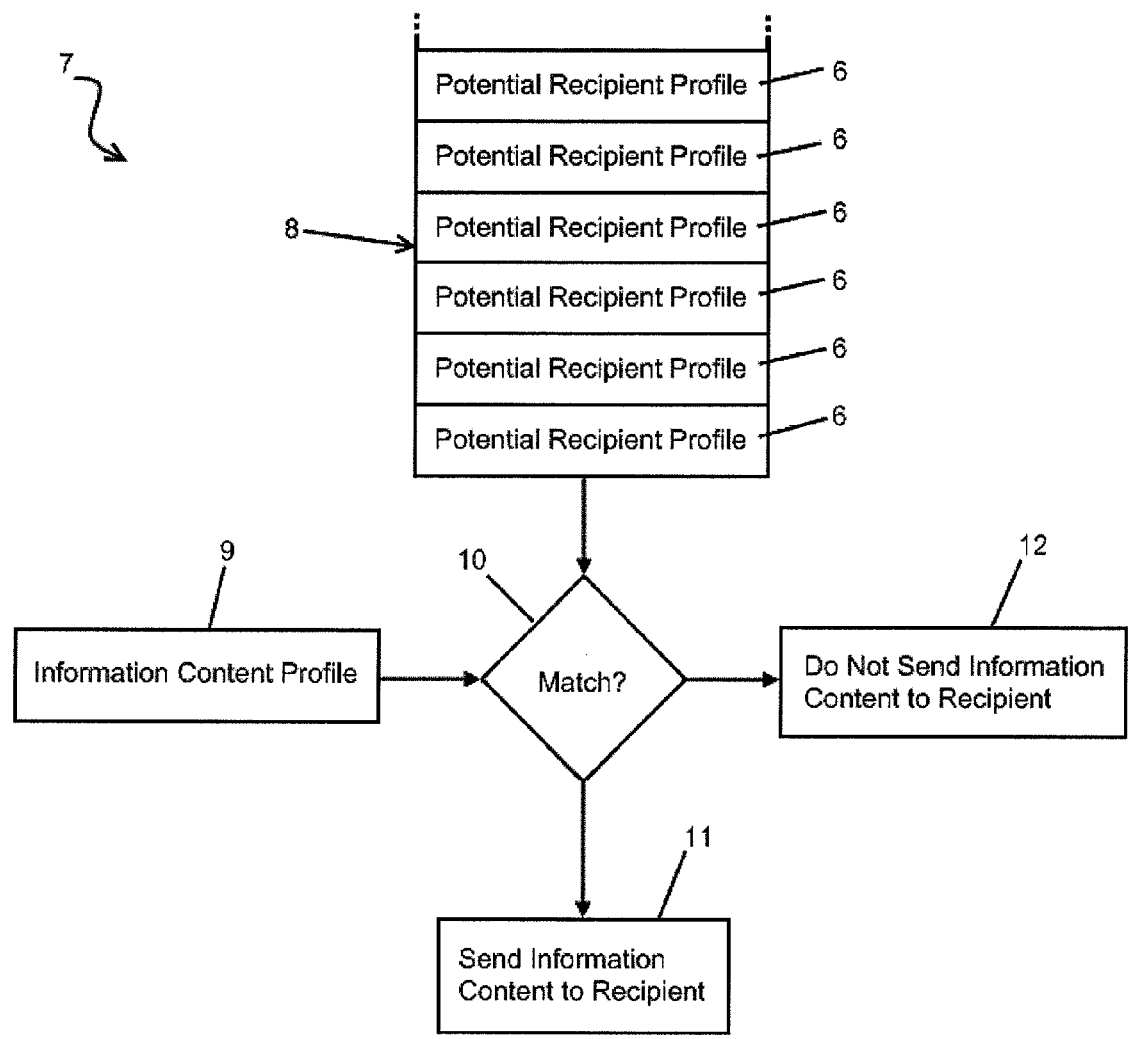
FIG. 2 shows aspects of an information content matching process.

With reference to FIG. 2, an embodiment comprises an information content matching process 7.

Recipient profiles 6—which may be recipient profiles 6 as generated in accordance with the recipient profile generation process 1—are collated in a recipient profile database 8.

An information content profile 9 is provided. The information content profile 9 is a profile 9 which is generated based on information content which it is intended to be distributed to one or more potentially interested recipients 2.

The recipient profile 6 of each of the potentially interested recipients 2 (as stored in the recipient profile database 8) is compared with the information content profile 9 in a comparison (or "matching") process 10 to identify recipients who are likely to be potentially interested in the information content.

If a match is identified then the information content is sent 11 to the recipient 2. If a match is not identified then the information content is not sent 12 to the recipient 2.

Figure 3:
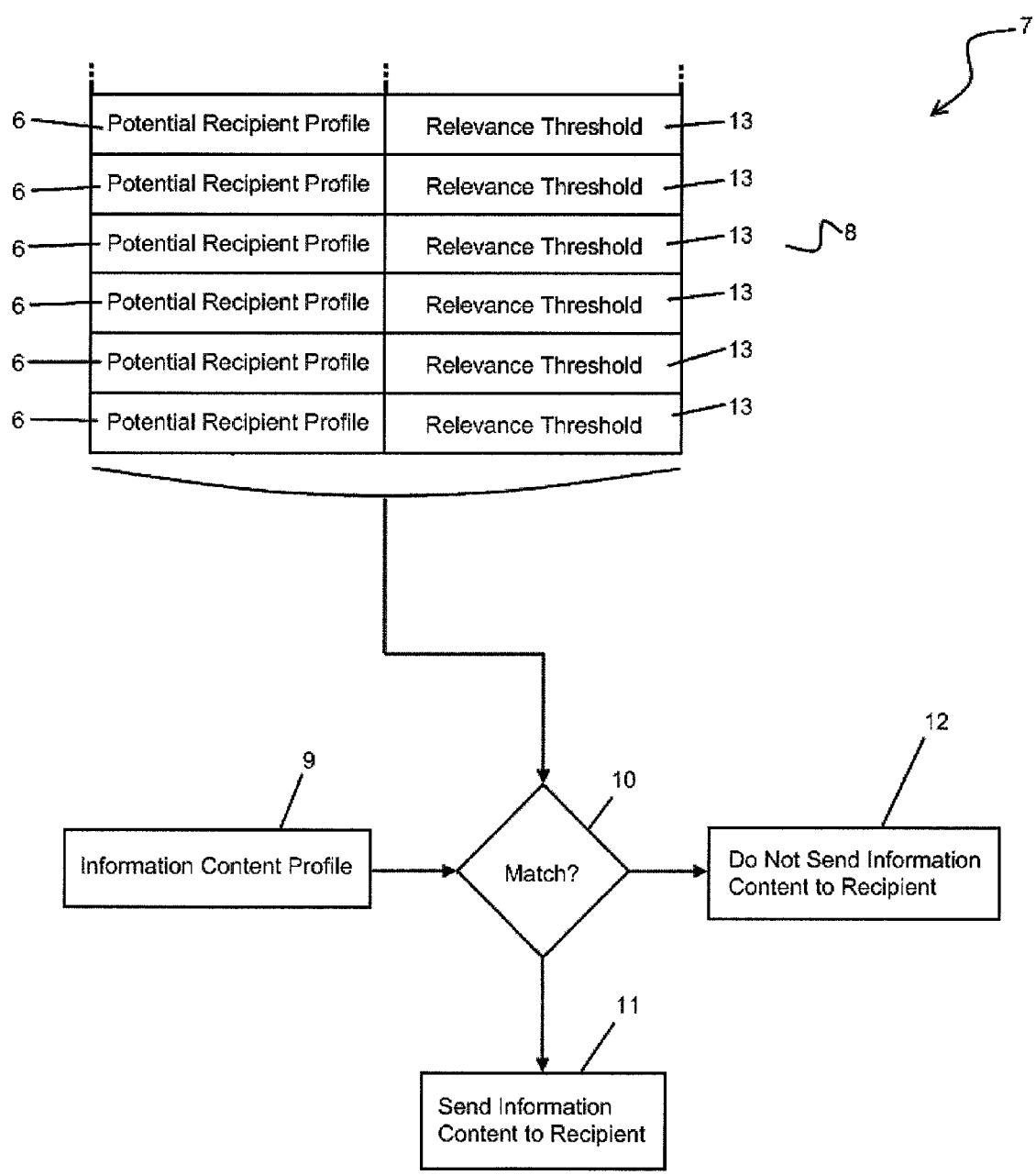
FIG. 3 shows aspects of an information content matching process.

With reference to FIG. 3, another embodiment of an information content matching process 7 is similar to the process 7 depicted in FIG. 2 and corresponding reference numerals are used for common features.

In this embodiment of the information content matching process 7, the recipient profile database 8 comprises, in addition to the potential recipient profiles 6, a relevance threshold 13 for each recipient profile 6.

The relevance threshold 13 comprises a threshold which has been set by the potential recipient 2. The relevance threshold 13 comprises an indication of how close the match between the recipient profile 6 and the information content profile 9 must be for the comparison process 10 to identify a match and send the information content to the potential recipient 2.

Thus, a relevance threshold 13 is associated with each potential recipient 2 and allows a potential recipient 2 to control the information content which is sent to them.

The process 7 otherwise operates in substantially the same manner as the process 7 of FIG. 2.

Figure 4:
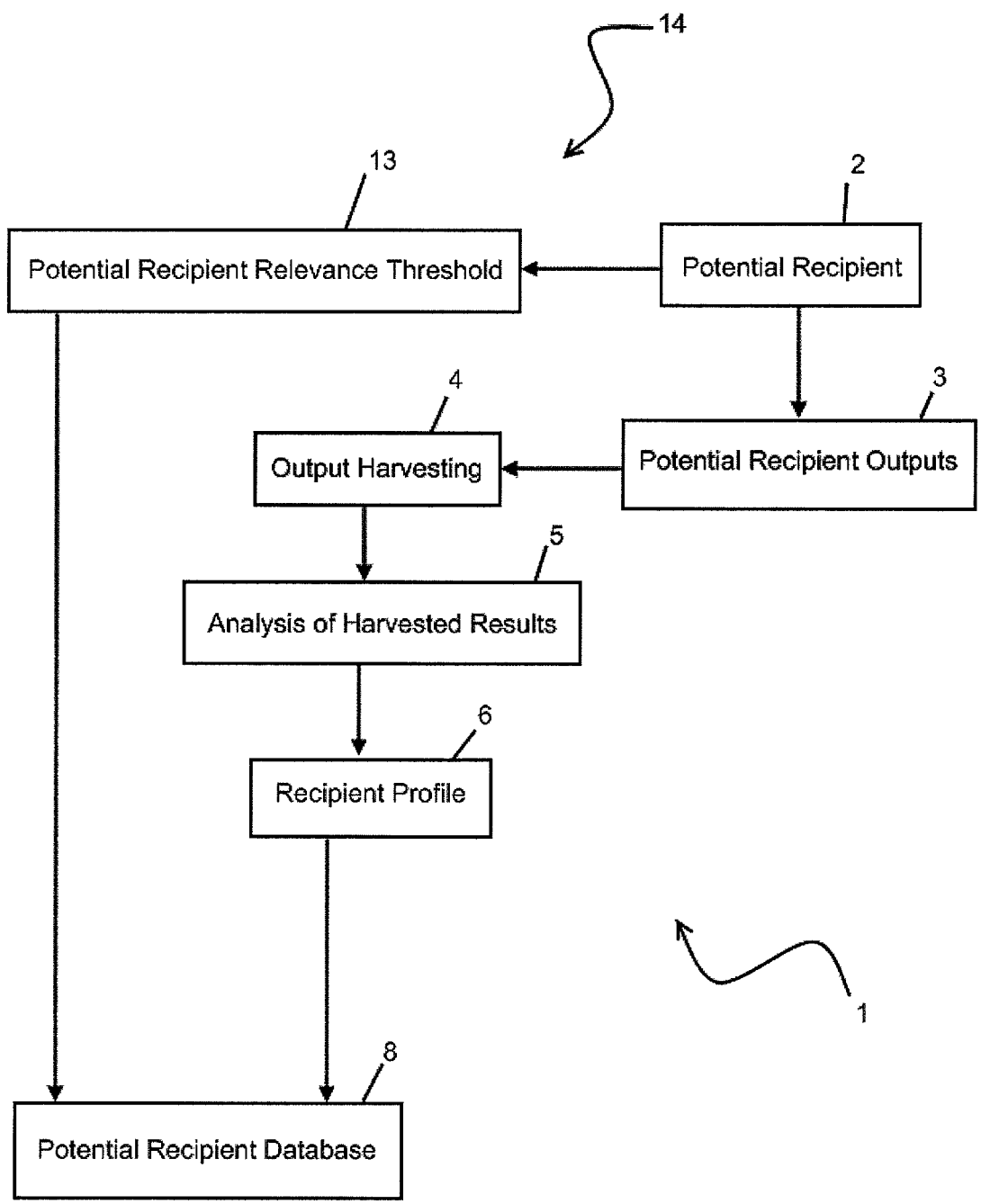
FIG. 4 shows aspects of a recipient profile generation process and a profile database generation process.

With reference to FIG. 4, a recipient profile database generation process 14 is shown. This process 14 includes a process which is similar to the recipient profile generation process 1 of FIG. 1A, as such like reference numerals have been used for like features. The recipient profile generation process 1 which forms part of the recipient database generation process 14 generally operates in the same manner as the corresponding process 1 of FIG. 1A.

In addition to the recipient profile generation process 1, the recipient profile database generation process 14 includes a potential recipient relevance threshold determination process. This process allows a recipient 2 to input a relevance threshold 13 which is then stored, along with a generated recipient profile 6, in the recipient profile database 8. The process 14 may be repeated for a plurality of potential recipients 2 to generate a database 8 containing information associated with the plurality of potential recipients 2.

Figure 5:
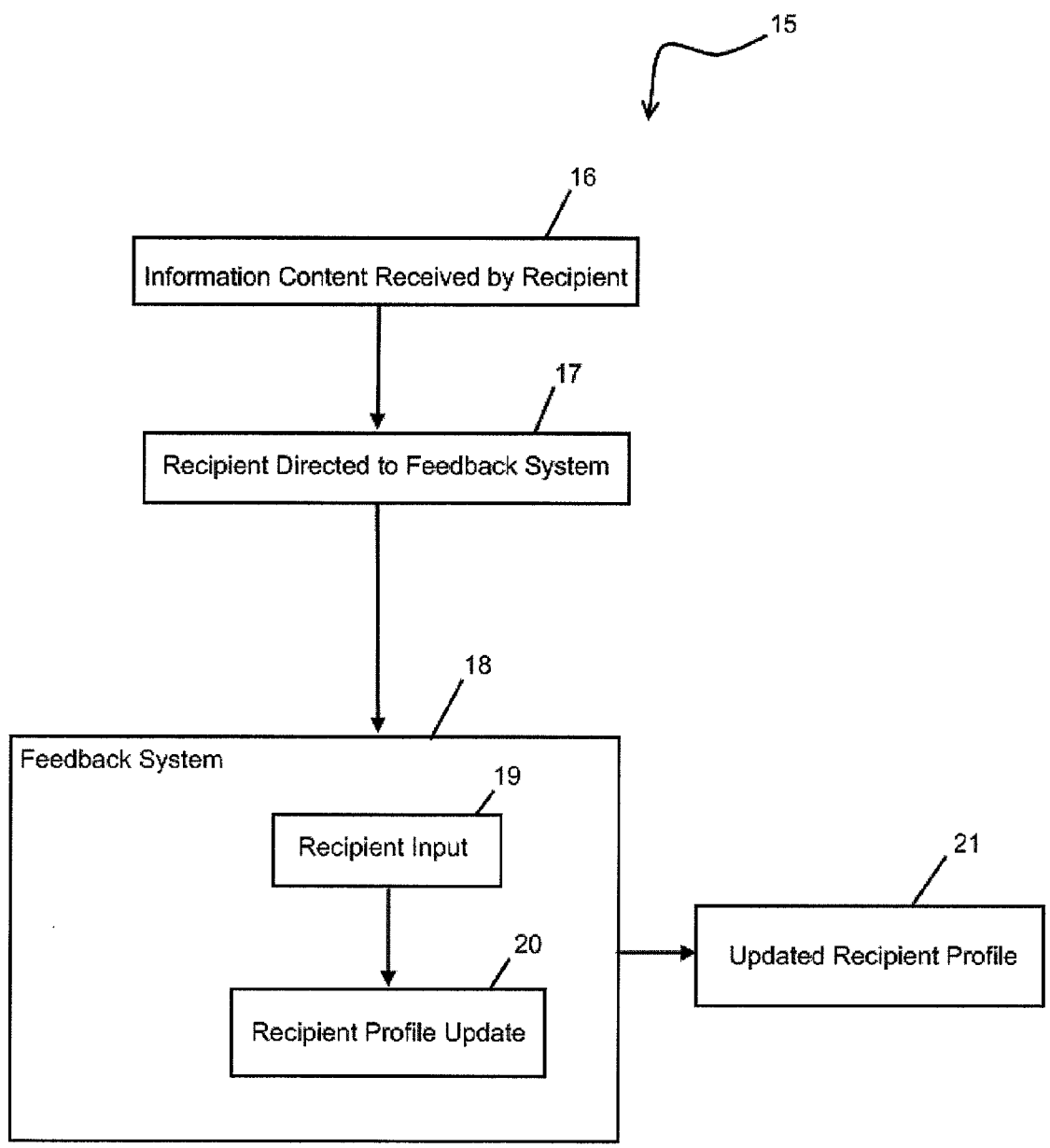
FIG. 5 shows aspects of a feedback process.

Another aspect of an embodiment is shown in FIG. 5, this aspect comprises a feedback process 15 through which a recipient 2 who has received 16 information content as the result of a match being determined during an information matching process 7 such as those of FIGS. 2 and 3.

In accordance with process 15, the recipient 2 receives 16 information content and is directed 17 to a feedback system 18. The feedback system 18 receives input 19 from the recipient 2 and updates 20 the recipient profile 6 associated with that recipient 2. The updated recipient profile 21 is the output and may be stored in a recipient profile database 8 (replacing the existing recipient profile 6 for that recipient 2).

An information content profile 9 has been mentioned above and an embodiment comprises an information content profile generation process 22. This process 22 is described with reference to FIG. 6.

An information content generator 23 generates information content 24 and this is analysed 25—in accordance with a process described in more detail below—to produce the information content profile 9.

This information content profile generation process 22 produces an information content profile 9 which is in a form which is suitable for comparison with a potential recipient profile 6—see FIGS. 2 and 3. In an embodiment, the information content profile 9 is in a form which is suitable for comparison with a potential recipient profile 6 with reference to a relevance threshold 13 associated with the potential recipient 2—see FIG. 3.

Thus, one or more of the above described processes, as a whole or in part, may be combined to form an information content distribution process 26. An example, of an information content distribution process 26 is shown in FIG. 7.

Figure 6:
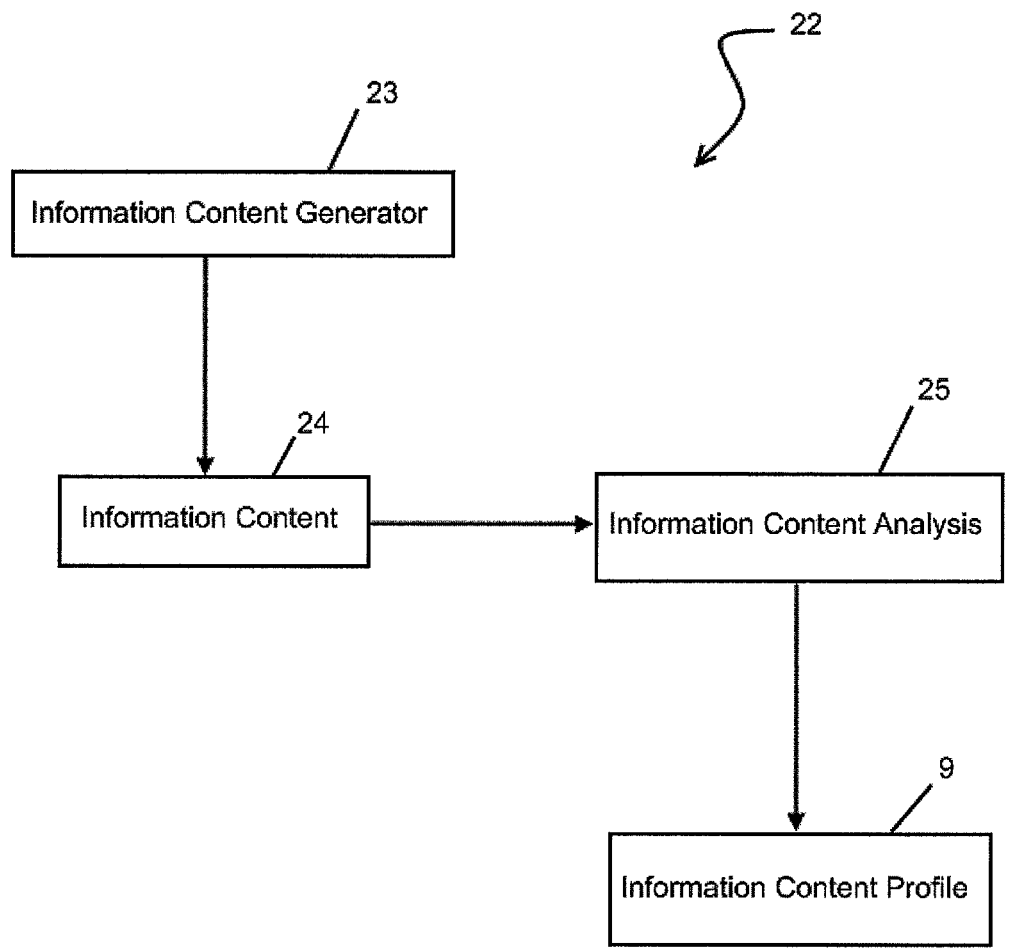
FIG. 6 shows aspects of an information content profile generation process.
Figure 7:
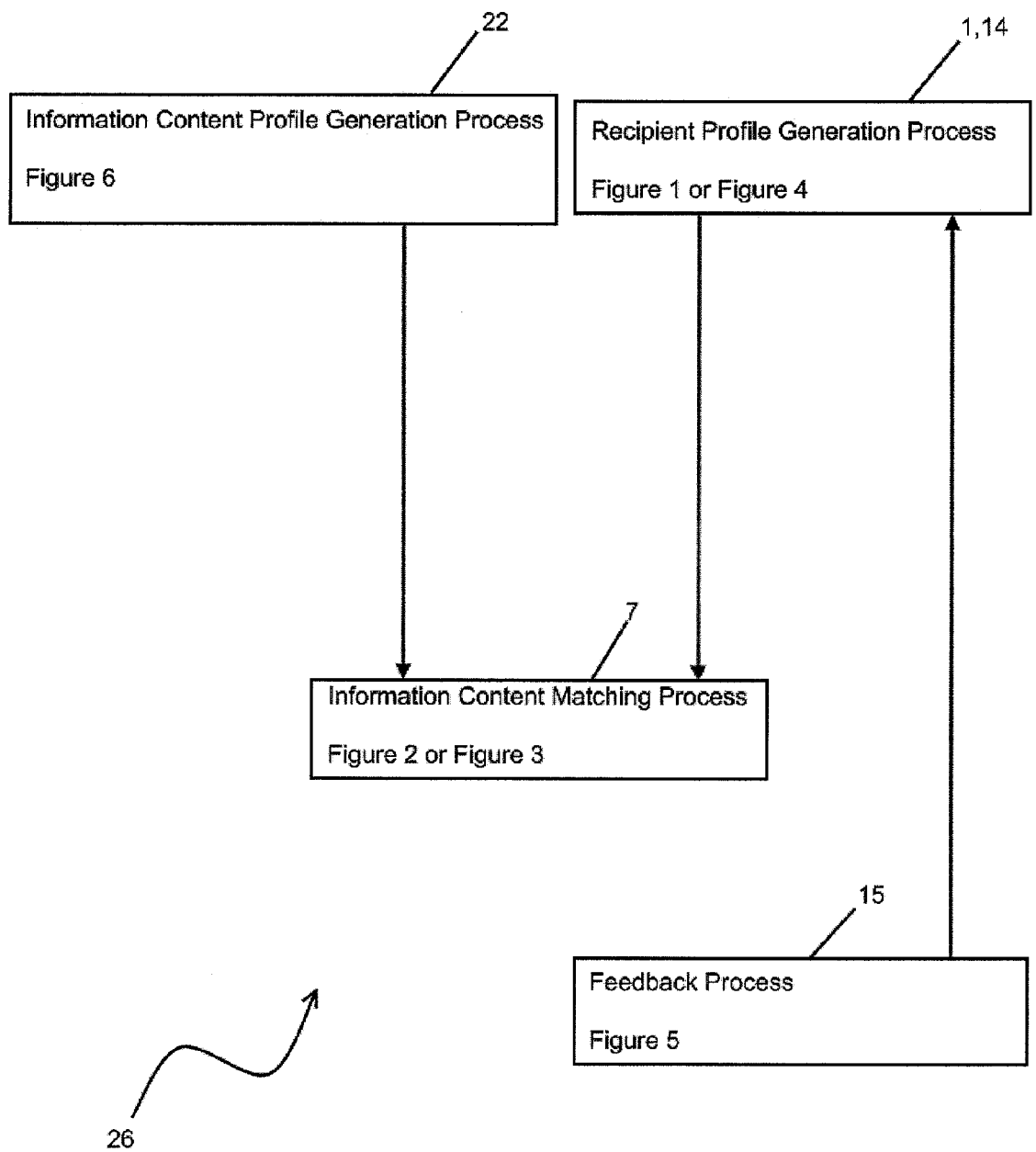
FIG. 7 shows aspects of an information distribution process.

The information content distribution process 26 shown in FIG. 7 comprises and information content profile generation process 22 (which may be a process 22 such as depicted in FIG. 6) and a recipient profile generation process 1 (which may be a recipient profile generation process 1 as depicted in FIG. 1A or a recipient profile generation process including a potential recipient relevance threshold as depicted in FIG. 4).

Information content 24 is submitted to the information content profile generation process 22 by, for example, an information content generator 23 and the information content 24 is analysed 25 to determine an information content profile 9.

The information content 24 may be, for example, an article prepared by the information content generator 23. One example of such an article is a news article regarding the launch of a new line of clothing which is generated by a clothing company.

The potential recipient generation process 1 is used to generate recipient profiles 6 for respective potential recipients 2. If applicable, each potential recipient 2 may also set a relevance threshold 13.

The recipient profiles 6 of potential recipients 2 are stored in a recipient profile database 8 (which may also store the respective relevance thresholds 13—see FIG. 4).

The information content distribution process 26 further comprises an information content matching process 7 (which may be an information content matching process 7 as depicted in FIG. 2 or FIG. 3). As part of the information content matching process 7, the information content profile 9 is compared 10 with the recipient profile 6 of each potential recipient 2 for which a profile 6 is stored in the database 8. If a match is identified, then the information content is sent 11 to the associated recipient 2. If a match is not identified, then the information content is not sent 12 to the associated recipient 2. If applicable, the relevance threshold 13 associated with each potential recipient 2 is used to confirm whether or not a match between an information content profile 9 and a recipient profile 6 is sufficient to qualify as an actual match (and hence result in the sending 11 of the information content 24 to the recipient 2).

The information content distribution process 26 may further comprise a feedback process 15 (which may be a feedback process 15 as depicted in FIG. 5). The feedback process 15 allows a recipient 2, who has been sent 11 information content as a result of the application of the information content matching process 7, to input 19 feedback into a feedback system 18 which causes the recipient profile to be updated 20 to provide an updated recipient profile 21 which is then stored in the recipient profile database 8 (replacing the existing recipient profile 6 associated with that potential recipient 2).

Thus, in the example of a clothing company issuing an article about the launch of a new line of clothing, the information content matching process 7 uses recipient profiles 6 for potential recipients 2 (and the associated relevance threshold 13—if applicable) to identify potential recipients 2 who are likely to be interested in the content of the article. The article is then sent 11 to those identified potential recipients 2.

The potential recipients 2 who receive 16 the article may then, in an embodiment, be offered the opportunity to provide feedback (or input 18) through a feedback process 15. If a recipient 2 is not, in fact, interested in the article then the feedback is used to update that recipient's 2 recipient profile 6 to produce an updated recipient profile 21. For example, the recipient 2 may be interested in fashion and so was originally identified as a match by the information content matching process 7 but that recipient's 2 interest in fashion may be limited to shoes rather than clothing as such. The updated recipient profile 20 may indicate a greater interest in shoes (in particular) within the field of fashion.

On the other hand, if a potential recipient 2 who received the article is particularly interested in the article, then the feedback provided by the recipient 2 may be used to produce an updated recipient profile 21 which reflects a greater interest in, for example, new lines of clothing (within the broader field of fashion).

Recipient Profile Generation Process and Recipient Profile Database Generation Process A recipient profile generation process 1 is depicted in FIG. 1A and a similar recipient profile generation process 1 including the setting of a potential recipient relevance threshold 13 is depicted in FIG. 4. FIG. 4 also depicts a recipient profile database generation process 14 in which the recipient profile 6 and relevance threshold 13 are stored in a recipient profile database 8.

These processes are described below in more detail by way of example.

When a potential recipient 2 is interested in being included in an information distribution system of which the recipient profile generation process 1 is a part, various details regarding the potential recipient 2 are collected.

In an embodiment, this information is collected from the potential recipient 2 through a website. The potential recipient 2 is, in an embodiment, required to enter contact details—for example an email address to which information content 24 which is identified as being potentially interesting to the recipient 2 can be sent 11. In an embodiment, contact details may be automatically obtained for the potential recipient 2; for example, an IP address for the potential recipient 2 may be obtained.

In addition, the potential recipient 2 may be required to enter one or more of the following: name, telephone number, publication/site/blog name, publisher, email address, alternative email address or addresses, website address (for example a Uniform Resource Locator (URL)), the details of any web based information content submission form which the potential recipient 2 wishes to use to submit information content, an indication of the number of unique users of the potential recipient's 2 website each month (which may be approximate), another form of indication of the number of users of the potential recipient's 2 website (for example the number of page views), permission to provide publicly available summary of the coverage achieved in relation to information content 24 submitted by the potential recipient 2, and the geographical location or base of the potential recipient 2.

It will be understood, that a potential recipient 2 is also likely to want to submit information content 24 for distribution. Therefore, in this embodiment, some aspects of some of the types of information which are requested from the potential recipient 2 is relevant to the submission of information content 24 rather than solely for the purposes of generating a recipient profile 6.

It will be appreciated, that in other embodiments, a potential recipient 2 is not interested in submitting information content 24 for distribution. As such, the information required from the potential recipient 2 is tailored accordingly.

In addition to the above information, a potential recipient 2 may also be required to enter the details of an information feed. A suitable information feed may comprise, for example, a RSS (Really Simple Syndication/Rich Site Summary) feed which provides summarised information in a standardised format based on a source of information content which may, for example, be information content generated by a potential recipient 2. This information content may be information content which is generated by the potential recipient 2 and published on their website.

Other forms of information feed are also known and are equally applicable to embodiments of the invention—such as the Atom syndication format.

The information submitted by the potential recipient 2 is processed in order to harvest 4 potential recipient outputs 3.

The potential recipient outputs 3 may comprise one or more of the content of information feeds, articles published on the potential recipient's 2 website, published letters and e-mails generated by the potential recipient 2, the potential recipient's blog, the potential recipient's social networking page, the potential recipient's Twitter outputs, and any other form of information content which was generated or published by the potential recipient 2 and which can be harvested.

One possible method of harvesting 4 potential recipient outputs 3 from a RSS feed associated with the potential recipient 2 is to program a computer to generate an Outline Processor Mark-up Language (OPML) file which contains the contents the information feeds (such as a RSS feed) for the potential recipient 2. The OPML file can then be automatically read by a computer and the URLs listed in the OPML file (typically one for each entry in the OPML file) can be stored in respective rows of a database (for example using Microsoft (registered trade mark) SQL. The URLs can be read from the database using the XML data type and SQLCLR user defined functions in Microsoft (registered trade mark) SQL for analysis.

The information gathered by this process is associated with a specific potential recipient 2 in order to build a prediction of the interests of the potential recipient 2 and to form a recipient profile 6.

The gathered information is, in an embodiment, passively gathered in that the potential recipient 2 need not generate the information for the purposes of the generation of a recipient profile 6; instead, the information is existing information which is collected by this process.

As will be appreciated, the more information which is collected and known about the potential recipient 2 the better the recipient profile 6 may be at indicating the interests and priorities of that potential recipient 2.

Other sources of information content produced by the potential recipient 2 are, of course, applicable to aspects and embodiments of the present invention. It will be appreciated that aspects and embodiments of the present invention can use a wide variety of different sources of information content for the potential recipient 2.

Preferably, the harvested information is stored in a database for analysis.

Once the information content from the potential recipient 2 has been harvested 4 the harvested information is analysed 5.

Figure 8:
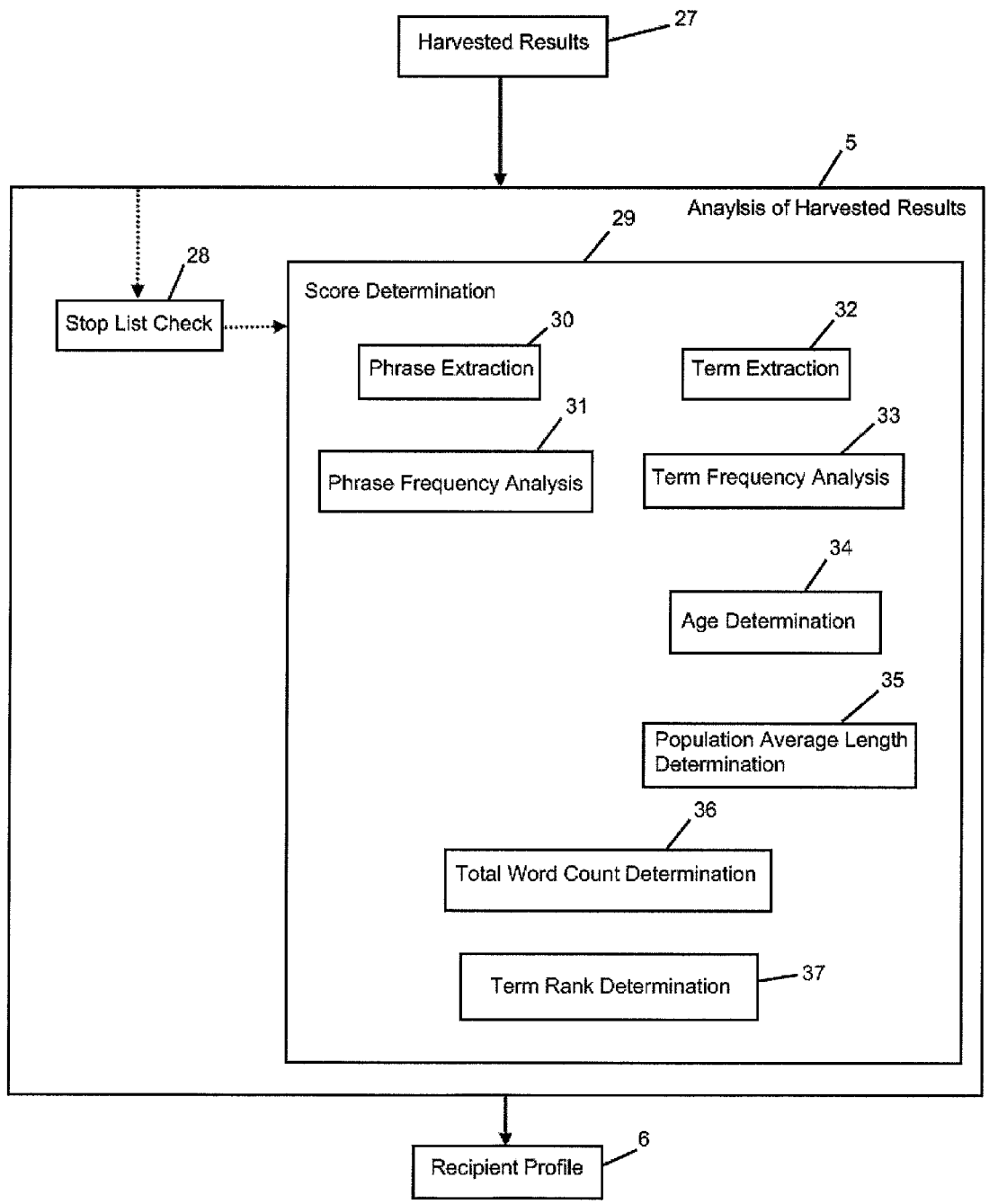
FIG. 8 shows aspects of an analysis process.

A variety of different methods of analysis of the harvested results 5 are possible. One such method will be described below—by way of example—with reference to FIG. 8.

The information content which resulted from the harvesting process 4 comprises harvested results 27 (also known as information content documents 3 or potential recipient outputs 3). These results 27 are analysed 5 in order to provide a score for substantially each term and/or phrase used in the information content of the results 27.

This score may be based on the frequency of the term or phrase used in the harvested results 27. Preferably, the score is not solely based on the frequency of occurrence of the term or phrase but is, instead, also based on the location of the term or phrase within the document or which it is a part and the age of that document.

A stop list check 28 may be performed in advance of the more detailed analysis. The stop list check 28 may comprise the removal of terms from the information content which has been harvested (i.e. the harvested results 27). These removed terms may comprise, for example, common words which have little relevance to the analysis process described below. Examples of such words include one or more of: a, the, it, is, of, or, all, as, at, any, for, have, has, he, she, their, there, its, isn't, including, more, form, on, or, once, said, such, they, then, than, us, and, them, me, my, we, what, which, when, but, this, just, such, are, with, into, to, give, and had.

The stop list check 28 may be performed and configured using database commands such as those provided by Microsoft (registered trademark) SQL.

Figure 9:
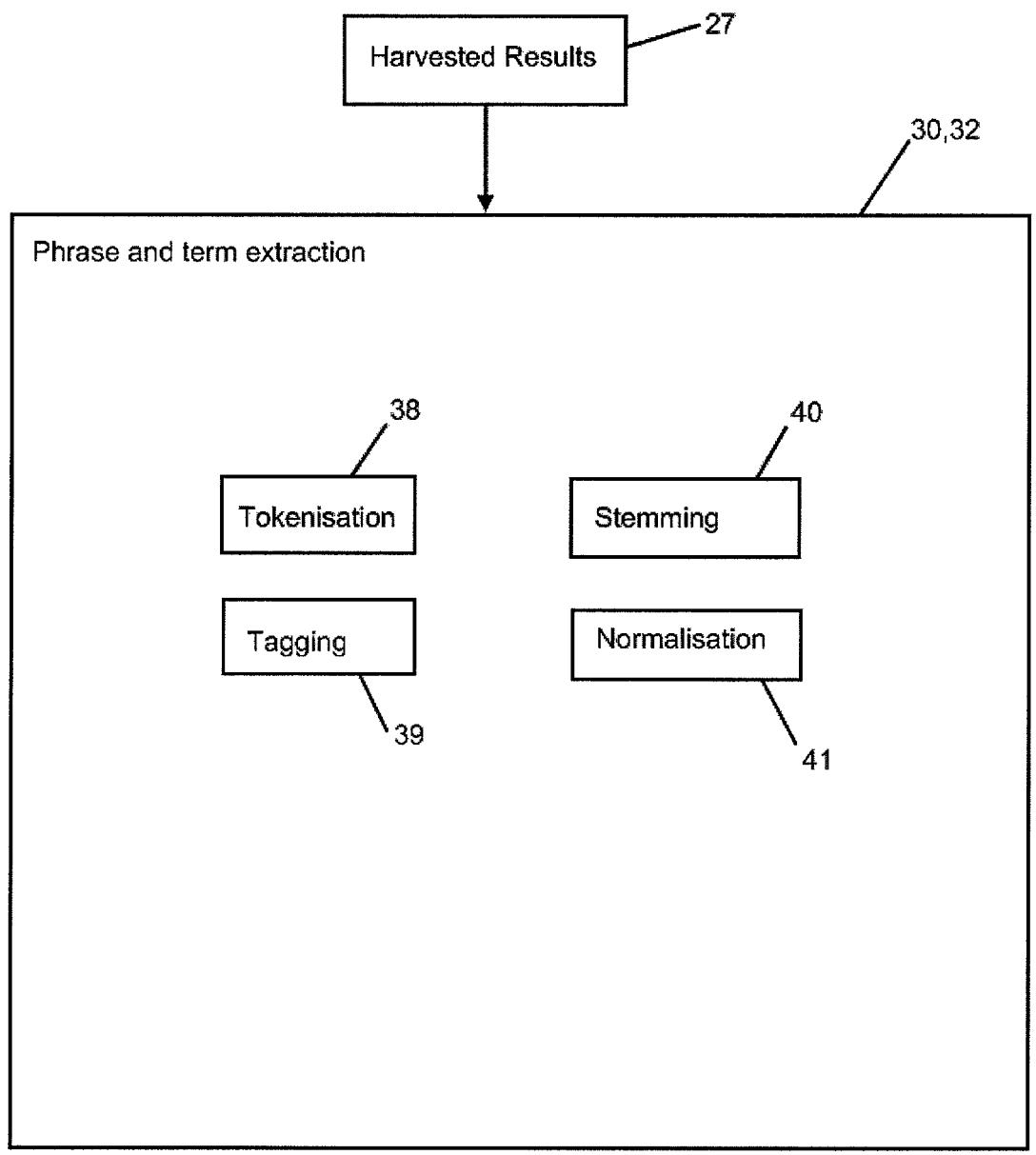
FIG. 9 shows aspects of an extraction process.

Phrase extraction 30 and term extraction 32 is performed on the information content—preferably after the stop list check 28—as part of a score determination process 29. Phrase 30 and term 31 extraction are shown in more detail in FIG. 9.

Phrase 30 and term extraction 32 are generally similar processes which use a dictionary and linguistic information to tokenise 38, tag 39, stem 40, and normalise 41 the information content of the harvested results 27. These processes 38,39,40,41 may be preformed in parallel or in series.

As used herein a "term" may comprise, for example, a "word".

Tokenisation 38 comprises one or more of:

separating text into terms or phrases by using spaces, line breaks, and other word terminators—for example, punctuation marks such as "?" and ":" are word-breaking characters, preserving terms or phrases that are connected by hyphens or underscores—for example, the terms "copy-protected" and "read-only" each remain as one term when tokenised, keeping acronyms that include periods intact—for example, "A.B.C Company" would be tokenised as "ABC" and "Company", splitting terms or phrases on special characters—for example, the term "date/time" is tokenised as "date" and "time", "(bicycle)" is tokenised as "bicycle", and "C#" is tokenised as "C"—special characters are discarded and cannot be lexicalised in the tokenisation process 38, recognising when special characters such as an apostrophe should not split terms—for example, the word "bicycle's" is not split into two words and is tokenised as the single term "bicycle", and splitting time expressions, monetary expressions, e-mail addresses, and postal addresses—for example, the date "Jan. 31, 2004" is separated into the three tokens "January, 31" and "2004".

It will be appreciated, therefore, that information content which is tokenised is separated into tokens for further processing. It will be understood that other tokenisation processes are possible and are applicable to embodiments. Tokenisation 38 can be applied on a term, word, or phase level.

Tagging 39 comprises the allocation of terms into linguistic groups (such as nouns, verbs, etc) and may include the tagging of one or more of:

nouns in the singular form—for example, bicycle and potato, nouns in the plural form—for example, bicycles and potatoes (all plural nouns are subject to stemming), proper nouns in the singular form—for example, April and Peter, proper nouns in the plural form—for example Aprils and Peters (for a proper noun to be subject to stemming, it must be a identifiable in the dictionary and linguistic information which is available to the process), adjectives—for example, blue, comparative adjectives that compare two things—for example, higher and taller, and superlative adjectives that identify object that have a quality above or below the level of at least one other object—for example, highest and tallest, numbers—for example, 62 and 2004.

It will be appreciated that tagging of phrases is also possible.

Stemming 40 is the process of lemmatising the terms and may include one or more of:

removing "s" from nouns—for example, "bicycles" becomes bicycle, removing "es" from nouns—for example, "stories" becomes story, and retrieving the singular form for irregular nouns from the dictionary information available to the process—for example, geese becomes goose.

Normalisation 41 is the process of normalising the case of terms and may be a case-sensitive normalisation process or a case-insensitive normalisation process include: normalising terms that are capitalised only because of their position in a sentence by converting these terms into their non-capitalised form instead—for example, in the phrases "Dogs chase cats" and "Mountain paths are steep", "Dogs" and "Mountain" would be normalised to "dogs" and "mountains" (with stemming 40 further reducing these terms to "dog" and "mountain").

If the normalisation 40 is case sensitive then terms like "Method" and "method" are not normalised and remain as two different terms. Capitalised terms which are not the first term in a sentence are not normalised and are tagged as proper nouns (see tagging 39 above).

If the normalisation 40 is case insensitive then terms like "Method" and "method" are recognized as variants of a single term. The list of extracted terms might include either "Method" or "method", depending on which term occurs first in the information content being processed.

The information content which has been tokenised 38, tagged 39, stemmed 40 and normalised 41 can then be processed to extract, for example, one or more of: the nouns and noun phrases. The nouns are processed by the term extraction process 30 and the noun phrases are processed by the phrase extraction process 32. In an embodiment, both of these processes 30, 32 are combined in a single term and phrase extraction process.

In an embodiment, the phrase 30 and term 31 extraction processes are implemented using database commands such as those provided by Microsoft (registered trade mark) SQL. In an embodiment, processes are performed on the information content in accordance with Microsoft (registered trademark) DN ms141809.

The outputs from the phrase 30 and term 32 extraction processes are fed into respective phrase 31 and term 33 frequency analysis processes which are also part of the score determination process 29.

Figure 10:
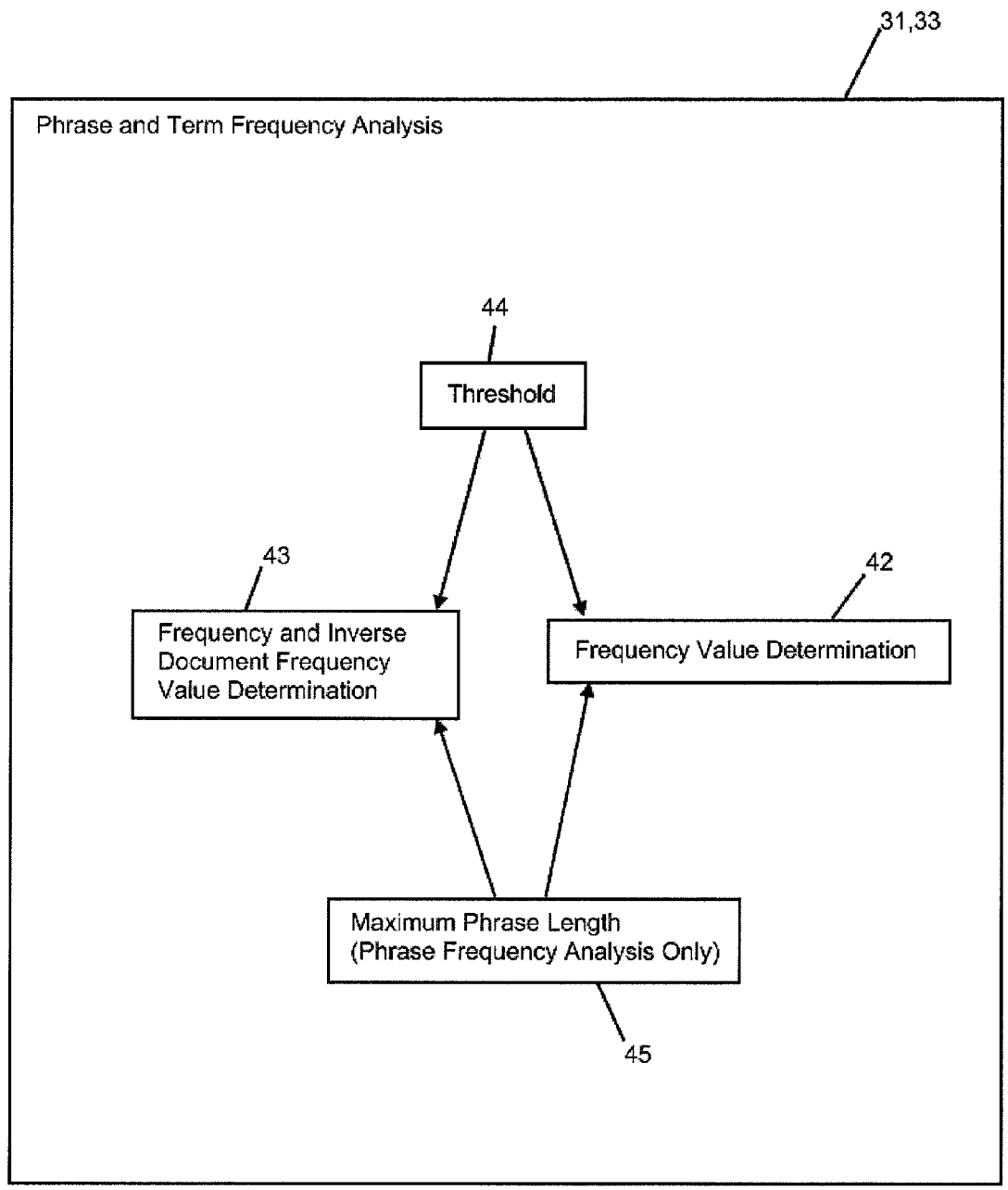
FIG. 10 shows aspects of an analysis process.

The phrase 31 and term 33 frequency analysis processes are shown in more detail in FIG. 10 and are generally comparable in operation.

The phrase 31 and term 33 frequency analysis processes are configured to output a frequency value for each extracted noun and/or noun phrase. Thus, the frequency analysis processes 31, 33 have respective sub-processes 42, 43.

The frequency value (as determined by the frequency value determination sub-process 42) for each extracted noun and/or noun phrase is a value which represents the number of occurrences of that noun or noun phrase in the extracted nouns and noun phrases. A threshold frequency 44 may be provided and the frequency of a noun or noun phrase must exceed the threshold frequency 44 if it is to be output by the phrase 31 and term 33 frequency analysis processes.

The phrase frequency analysis process 31 (and, in an embodiment, not the term frequency analysis process 33) has a maximum phrase length limit 45. Extracted phrases which exceed this length are not processed by the phrase frequency analysis process 31.

The threshold frequency 44 and maximum phrase length limit 45 may be adjustable. Preferably, an operator of the process is provided with the option to alter these values. The threshold frequency may be set to one or two or any other desired number.

Document age determination 34 may be preformed by checking a date and/or time associated with the document being analysed. This process is part of the score determination process 29. The date and/or time associated with the document may be text in the document or, for example, data stored in a document header.

Total word/term count determination 35 can be used to determine the total number of terms (i.e. "words") in a document being processed by score determination process 29 and forms a part thereof. This may be the total number of words in the original document or the total number of words after the application of the tops check list 28.

A term rank determination process 37 ranks each of the extracted terms in a document in order of their appearance in the document. Each term is provided with a numerical value indicating position within the document. If a term is repeated in a document, then the second and each subsequent occurrence of the term in the document is ignored—only the first occurrence of a term in a document is ranked.

It will be understood that the recipient profile 6 may be generated in a score determination process 29 by:

phrase extraction 30 and subsequent phrase frequency analysis 31, term extraction 32 and subsequent term frequency analysis 33, document age determination 34, population average length determination 35, total word count determination 36, and term rank determination 37. The outputs from these processes are then input into equations below to generate a recipient profile 6.

In an embodiment, a chronological term rank (CTR) algorithm is used. This algorithm may be:

$$CTR = E - \left( E \cdot F \cdot \frac{\log\left(\frac{termr - 1}{30} + 10\right)}{\log\left(\frac{docl}{30} + 10\right)} \right) \quad \text{[Equation 1]}$$

In this equation:

CTR, is the chronological term rank which is the ranked sequence of unique words and phrases as they are encountered in an information content document being analysed as it is read from start to finish—as determined by the above equation, docl, is the count of all the words in the information content document (i.e. the document length), termr, is the rank of each unique term in a document as they appear from start to finish of the document, E is a constant (e.g. value=1), and F is also a constant (e.g. value=0.8).

As will be appreciated, termr can be replaced by phraser (which is the rank of each unique phrase in a document as they appear from start to finish of the document) in equation 1 for the analysis of phrases.

The chronological term rank is used in order to calculate a receiver (or recipient) key word score (ReceiverKS) using, for example, the following equation:

$$ReceiverKS = \frac{tf}{0.5 + 0.1 \cdot \frac{dl}{avdl}} \cdot CTR \quad \text{[Equation 2]}$$

In this equation:

tf, is the frequency which a term appears in an information content document, and avdl, is the average length of all the information content documents in the population of information content documents (i.e. average document length)—the other variables are as specified above.

As will be appreciated, tf can be replaced by pf (which is the frequency which a phrase appears in an information content document) in equation 2 for the analysis of phrases.

The receiver key word score (ReceiverKS) can then be used to calculate a receiver key word rank score (rkrs) 80 in accordance with, for example, the following equation:

$$RKRS = ReceiverKS \cdot \frac{1}{\ln\left(\frac{aa}{AC}\right)} \quad \text{[Equation 3]}$$

In this equation,

ReceiverKS is the receiver key word score as calculated by, for example, (equation 2 above), aa is the age of the information content document in days, and AC is a constant (of value 1.00E-10).

An rkrs may be calculated for each term and/phrase in a document.

As mentioned above, the term "document" as used in relation to the above equations is for ease of reference only. A "document" is, for example, an item of information content such as a webpage, blog entry, information feed entry, status update, email or the like.

If, for example, a term or phrase appears in multiple information content documents within the same potential recipient's RSS feed or other collection of information content documents 3, then the scores for that particular term are summed or otherwise combined.

The result of this process is a recipient profile 6. The recipient profile preferably comprises a list of terms and phrases used in information content generated by the potential recipient 2. The profile 6 also comprises a receiver key word rank score 80 for each of these terms.

As will be appreciated, the receiver key word rank score 80 is calculated based on elements of an OkapiBM25 ranking function combined with the chronological term rank algorithm.

The constant AC in equation 3 (and, indeed, the constants E and F), may be set on a system-wide level such that each all recipient profiles 6 are generated using the same constant values. In an embodiment, one or more of the values of the variables AC, E, and F are stored in the respective recipient profiles 6 for one or more potential recipients 2; one or more of the constant values for a potential recipient 2 may, therefore, be different from the constant values for another potential recipient 2.

Figure 11:
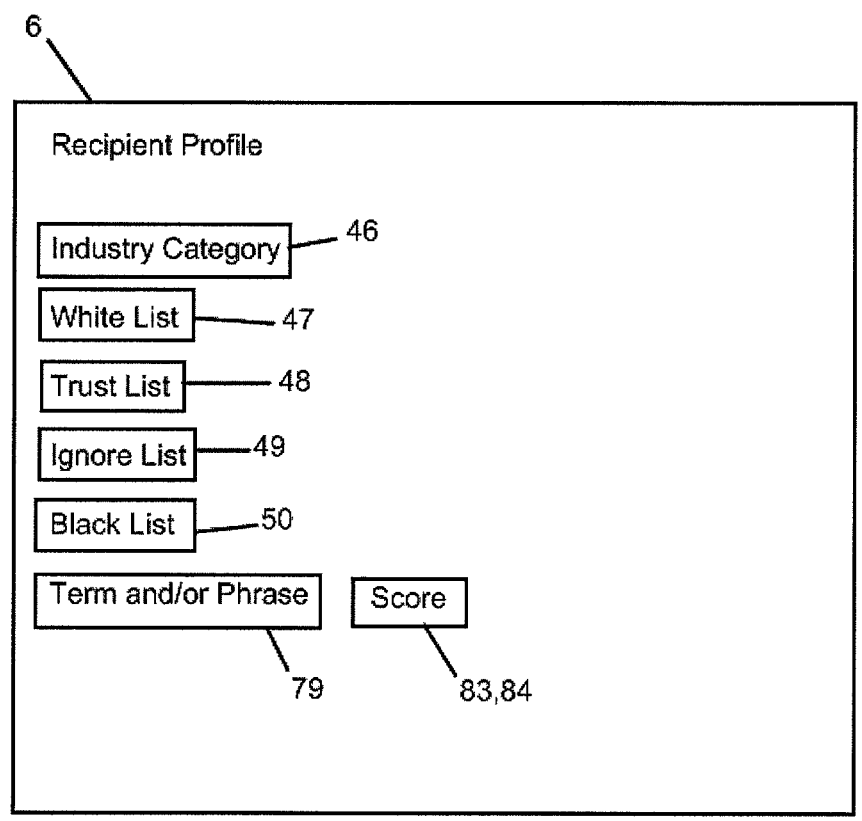
FIG. 11 shows aspects of a recipient profile.

In an embodiment, the recipient profile 6 may further comprise an industry category 46 (see FIG. 11). The industry category 46 is initially set of a group of potential recipients 2 manually. This manual setting of an industry category 46 may be performed by an operator of the information content distribution process 26. In an embodiment, an industry category 46 is part of the information which is provided by the potential recipient 2 as described above.

In an embodiment, the recipient profile 6 may further include one or more of a white list 47, a trust list 48, an ignore list 49, and a black list 50 (see FIG. 11).

The trust list 48 is a list of terms and/or phrases which are favourably (i.e. positively) weighted in the information content matching process 7. The terms and/or phrases in the trust list 48 may be positively weighted by 10% in the information content matching process 7 such that they are more likely to result in a positive match (and information content 24 which includes these terms and/or phrases is more likely to be sent 11 to the potential recipient 2).

The white list 47 is a list of terms and/or phrases that have been automatically identified by the information content distribution process 26 as being positively matched in the information content matching process 7 frequently. The terms and/or phrases in the white list 47 may be positively weighted and this positive weighting may be by 2% in the information content matching process 7 such that they are more likely to result in a positive match (and information content 24 which includes these terms and/or phrases is more likely to be sent 11 to the potential recipient 2). Each term and/or phrase can receive multiple 2% positive weightings (in this example) up to a maximum positive weighting (which may be 10%). Thus, frequently matched terms and/or phrases are more likely to cause a match in the future.

The ignore list 49 comprises a list of terms and/or phrases which are not weighted (positively or negatively).

The black list 50 comprises a list of terms and/or phrases that have been automatically identified by the information content distribution process 26 as not being positively matched in the information content matching process 7 frequently. The terms and/or phrases in the black list may be negatively weighted and this negative weighting may be by 2% in the information content matching process 7 such that they are less likely to result in a positive match (and information content 24 which includes these terms and/or phrases is more likely to be sent 11 to the potential recipient 2). Each term and/or phrase can receive multiple 2% negative weightings (in this example) up to a maximum negative weighting (which may be 10%). Thus, infrequently matched terms and/or phrases are less likely to cause a match in the future.

The analysis of the harvested results 5 is a computer implemented method and is achieved by a computer under the control of a computer program which is configured to perform the above processes.

As shown in, for example, FIG. 4, a potential recipient 2 may also indicate a potential recipient relevance threshold 13. As is explained in more detail below with reference to the information content matching process 7, the potential recipient relevance threshold 13 is an indication which may be set by a potential recipient 2 as to how closely information content 24 must match that particular recipient profile 6 in order for the potential recipient 2 to be sent the information content 24.

In order to allow potential recipients 2 to modify the potential recipient relevance threshold 13, a potential recipient 2 may be provided with a graphical user interface (which may be supplied over the internet through a webpage—for example) which allows the potential recipient 2 to modify the level of the relevance threshold 13. The modified level is then stored in the recipient profile database 8 and replaces the previous relevance threshold 13 associated with that potential recipient 2.

Figure 12A:
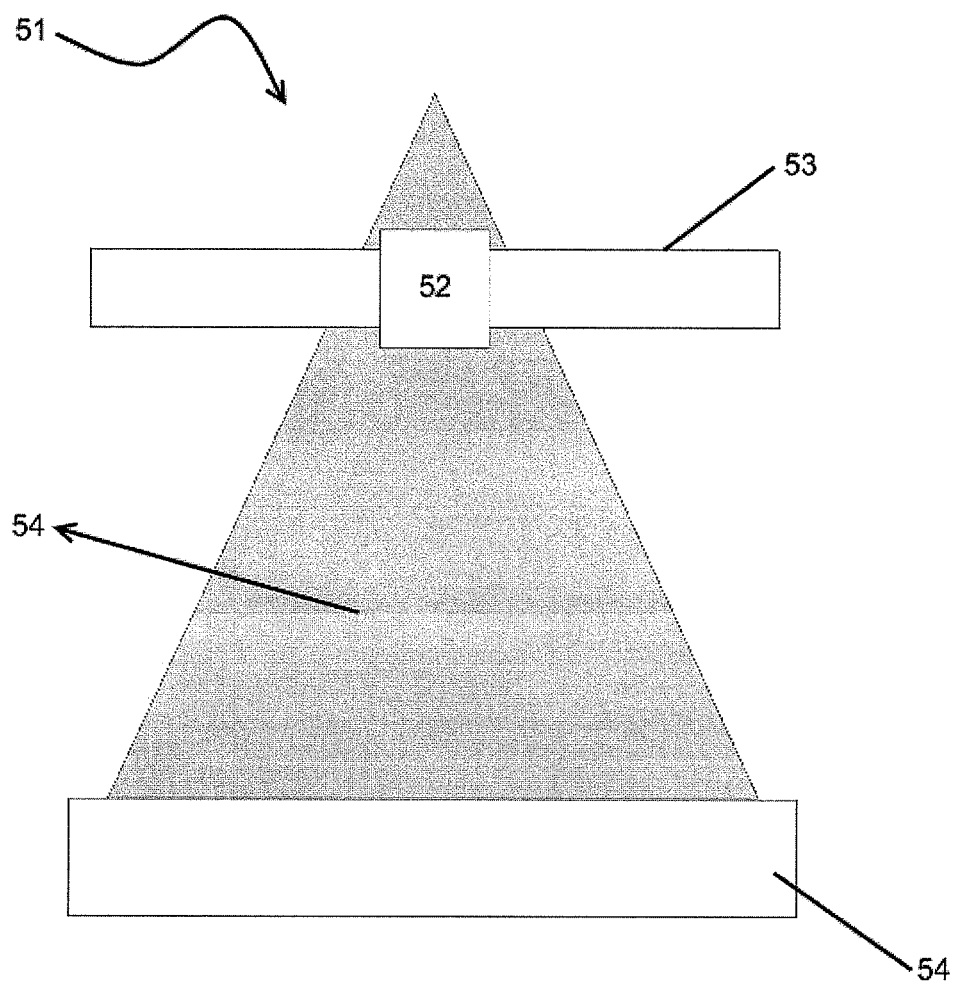
FIG. 12a, b, & c show aspects of a graphical user interface.

Various different forms of this graphical user interface are envisaged and some of these forms are depicted FIGS. 12a, 12b and 12c. Each graphical user interface 51 comprises a level indicator 52 and an interactive user controllable element 53. In addition, further graphical elements 54 may be provided.

With reference to FIG. 12a, a graphical user interface 51 comprises an interactive user controllable element 53 in the form of a bar which extends across a further graphical element 54. The further graphical element 54 comprises an isosceles or equilateral triangle. In the centre of the bar which forms the interactive user controllable element 53 is a level indicator 52. A potential recipient 2 can select the interactive user controllable element 53 and move the element 53 with respect to the further graphical elements 54 up or down the equilateral/isosceles triangle which forms a further graphical element 54. As the interactive user controllable element 53 is moved with respect to the further graphical element 54, an indication of the relevance threshold level 13 is provided in the level indicator 52 located on the interactive user controllable element 53.

When the interactive user controllable element 53 is towards the top of the triangle which forms one of the further graphical elements 54 the relevance threshold 13 is set such that a high degree of match must exist between a recipient profile 6 and an information content profile 9 in order for the information content 24 associated with the profile 9 to be sent 11 to that potential recipient 2. This is graphically indicated by the narrow upper end of the triangle of the further graphical element 54—indicating that there will be less information content which meets this criterion.

If the potential recipient 2 wishes to receive more information content 24 which may be less relevant (information content 24 for which the match between the recipient profile 6 and the information content profile 9 is weaker) then the potential recipient 2 can adjust the interactive user controllable element 53 so that the element 53 is closer to the base of the triangle of the further graphical element 54. Thus, a greater quantity of information 24 will be sent 11 to the recipient 2 but this information may be less relevant to the interests and priorities of the potential recipient 2.

At the base of the triangle forming one of the further graphical elements 54 is an additional further graphical element 54. This additional further graphical element 54 may, for example, provide an indication of the type of information content 24 which would be sent 11 to the potential recipient 2 if the relevance threshold 13 is at its current level (i.e. when the interactive user controllable element 53 is in its current location with respect to the further graphical elements 54).

FIGS. 12b and 12c show respective alternative embodiments of the graphical user interface 51—like reference numerals have been used for like features.

In the embodiments in FIG. 12b, the graphical user interface comprises a dial which forms the interactive user controllable element 53. A number of values are indicated around the dial and these form respective level indicators 52. In this embodiment, the further graphical elements 54 comprise the additional, optional features of the dial such as the ribbing around the outside of the dial.

In order to adjust the relevance threshold 13 using the graphical user interface 51 of the embodiment depicted in FIG. 12b, a user may select the interactive user controllable element 51 in the form of the dial and rotate the dial with respect to the plurality of level indicators 52 until the dial is set such that the pointer of the dial points towards the relevant level indicator 52.

In accordance with the embodiment shown in FIG. 12c, the graphical user interface 51 comprises a tap. The interactive user controllable element 53 of the tap is the rotatable member. The other features of the tap comprise further graphical elements 54. A water droplet is graphically represented as indicated in FIG. 12c and provides the level indicator 52. The potential recipient 2 wishes to adjust the relevance threshold 13, then the potential recipient 2 can select and rotate the interactive user controllable element 53. By rotating the interactive user controllable element 53 in a first direction, the water droplet depicted as the level indicator 52 will increase in size and a numerical value indicating the relevance threshold 13 is shown in the centre of the water droplet. When the interactive user controllable element 53 is rotated in the opposing direction, then the water droplet depicted as the level indicator may decrease in size and a corresponding numerical value may be depicted in the centre of the water droplet indicating the relevance threshold 13.

It will be appreciated that there are numerous different embodiments of a graphical user interface 51 which allow a user to select and control the level of the relevance threshold 13.

Not all embodiments of the present invention incorporate a relevance threshold 13. In such embodiments, it may be that a relevance threshold 13 is, in fact, used but that this relevance threshold 13 is set at a predetermined value for all potential recipients 2. This relevance threshold 13 may be controllable by the operators of the information content distribution process 26 and may not be adjustable by the potential recipients 2.

The relevance threshold 13 is explained in more detail below in relation to the information content matching process 7.

Figure 1B:
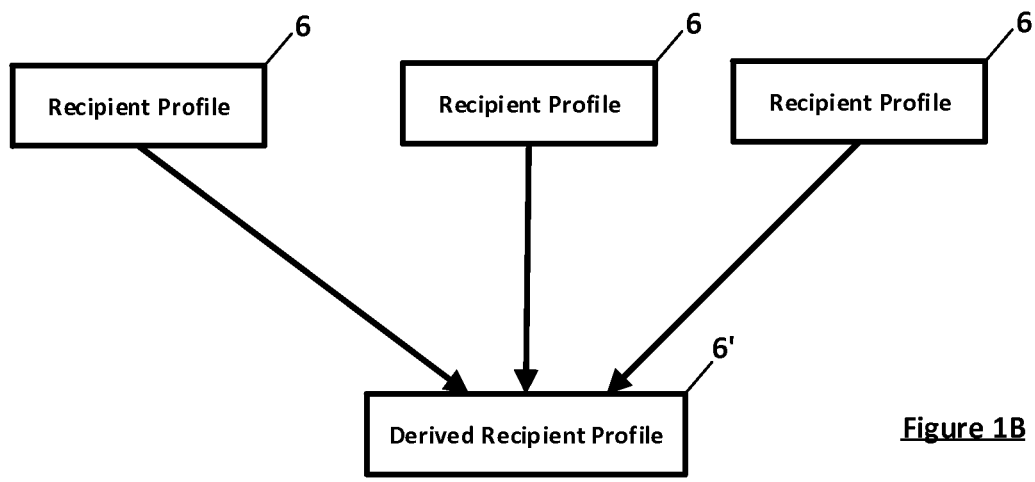
FIG. 1B shows further aspects of the recipient profile generation process.

It will be appreciated that a potential recipient 2 may not have suitable information content outputs 3 to be harvested 4 or the information content outputs 3 may be inadequate to form a reasonable recipient profile 6. In such instances, the recipient profile generation process 1 may provide an approximate recipient profile 6 based on the recipient profiles 6 of other similar potential recipients 2. Thus, for example, is a potential recipient 2 is determined as belonging to a particular industry category 26, the recipient profile generation process 1 may identify other potential recipients 2 whose profiles are stored in the recipient profile database 8 and who have be allocated the same industry category 46. The process 1 may then copy the one of the recipient profiles 6 of such a matched potential recipient 2 to form the new potential recipient's 2 recipient profile 6. In an embodiment, as shown in FIG. 1B, the process 1 takes information from the recipient profiles 6 of several such matched recipients 2 to derive a new recipient profile 6' for the new potential recipient 2—this may be an averaging process in which the receiver keyword rank score for a number of terms and/or phrases which are common to all of the recipient profiles 6 are averaged to form the respective receiver keyword rank scores for those terms and/or phrases in the new recipient profile 6 for the new potential recipient 2.

Information Content Profile Generation and Information Content Matching Process

An information content generator 23 may generate information content 24 which is then analysed 25 to generate an information content profile 9—as shown in FIG. 6—in an information content generation process 22.

Figure 13:
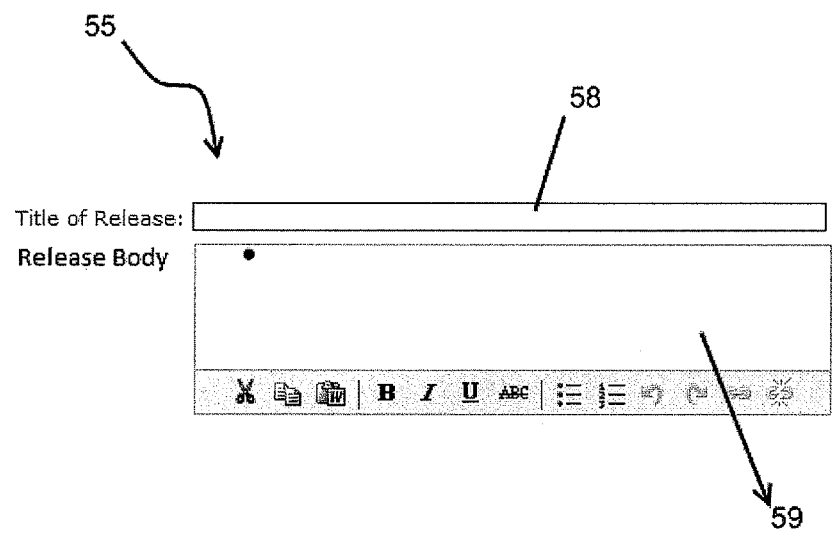
FIG. 13 shows aspect of a form.
Figure 14:
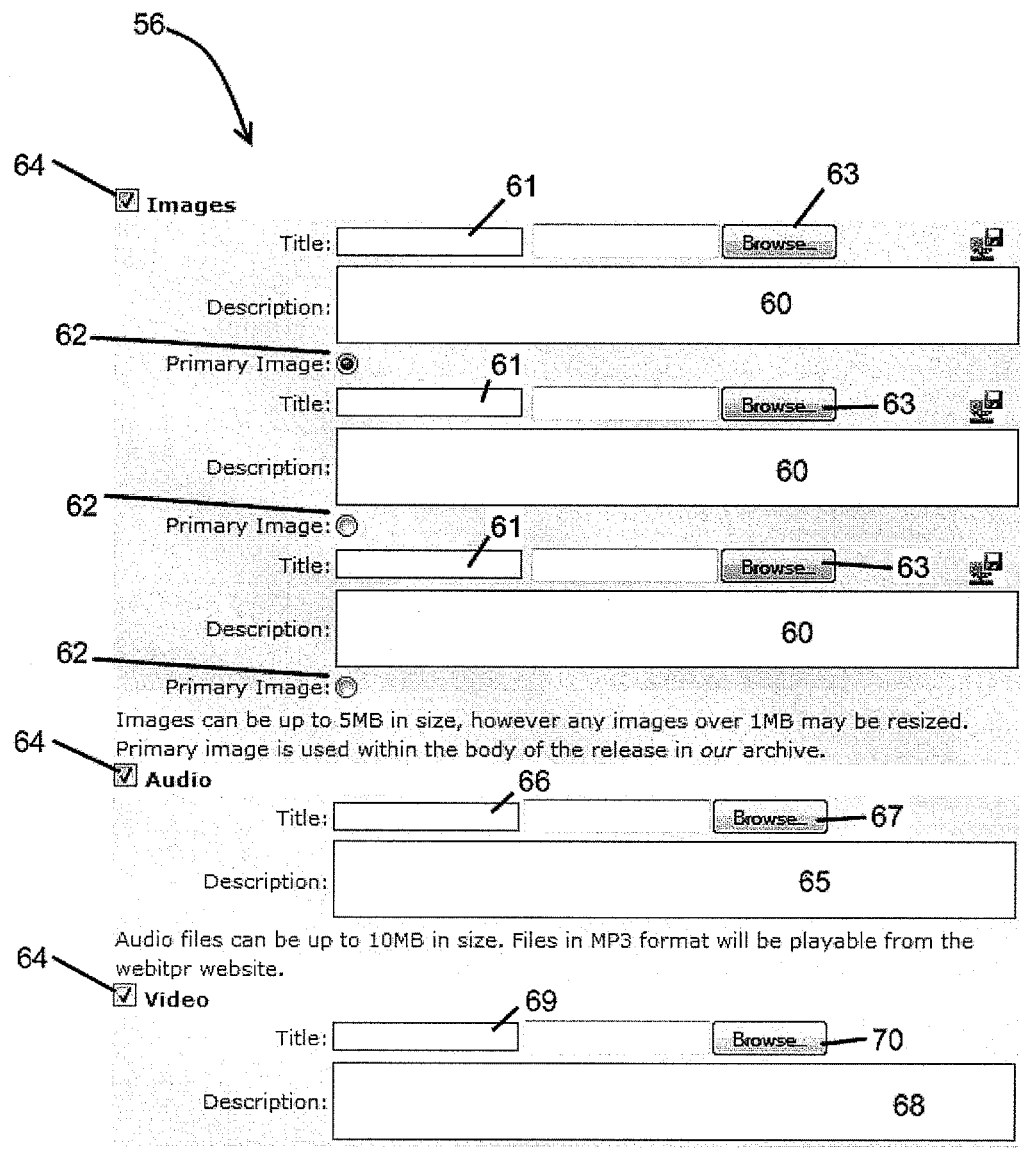
FIG. 14 shows aspect of a form.
Figure 15:
FIG. 15 shows aspect of a form.
Figure 15:
Figure 15:

The information content generator 23 may submit the information content 24 to the information content distribution process 26 through an electronic form or series of electronic forms—such as the forms 55,56,57 shown in FIGS. 13, 14 and 15.

A main form 55 shown in FIG. 13 comprises a title entry field 58 and a release body field 59. The information entered by the information content generator 23 into the fields 58,59 forms part of the information content 24 for analysis 25. As will be understood, the term "release" as used herein generally refers to information content 24 which is being submitted for distribution. Similarly, as used herein, the term "receiver" is intended to have generally the same meaning as the term "recipient".

A multimedia form 56 shown in FIG. 14, in an embodiment, comprises one or more image title entry fields 61 for the entry of respective image titles, a corresponding number of description fields 60 for the entry of respective image descriptions, a corresponding number of image file selection fields 63 for the selection of respective image files, and a corresponding number of radio buttons 62 for selecting an image as a primary image. The form 56 may also comprise a check box 64 to identify whether or not images are to be included in the information content 24. In a preferred embodiment, there are facilities for including three images in the information content 24.

Similarly, an embodiment of the multimedia form 56 in FIG. 14 comprises one or more audio title entry fields 66 for the entry of respective audio titles, a corresponding number of description fields 65 for the entry of respective audio descriptions, and a corresponding number of audio file selection fields 67 for the selection of respective audio files. The form

56 may also comprise a check box 64 to identify whether or not audio files are to be included in the information content 24.

Similarly, an embodiment of the multimedia form 56 in FIG. 14 comprises one or more video title entry fields 69 for the entry of respective video titles, a corresponding number of description fields 68 for the entry of respective video descriptions, and a corresponding number of video file selection fields 70 for the selection of respective video files. The form 56 may also comprise a check box 64 to identify whether or not video files are to be included in the information content 24.

In an embodiment, the summary form 57 comprises one or more summary fields 71, 72, 73. These summary fields 71, 72, 73 may comprise a boilerplate field 71, a release summary field 72 and a SEO keywords field.

The boilerplate field 71 is for entry of a re-usable summary of the information content 24. The release summary field 72 is for entry of a summary of the information content 24. The SEO keyword field 73 is for entry of search engine optimisation keywords associated with the information content 24.

In an embodiment, additional supplementary files may be added to the information content 24 using a similar form.

In an embodiment, a form (not shown) is also provided for the addition of relevant URLs to the information content 24.

The type/format and size of image files which can be added to the information content 24 may be limited. For example, suitable image file formats may include: GIF, JPG (JPEG), BMP, PNG, EPS, PSD, and TIF (TIFF); and a suitable file size limit may be 5 Mb.

The type/format and size of audio files which can be added to the information content 24 may be limited. For example, suitable audio file formats may include: MP3, WMA, WAV, SND, AU, AIF, AIFC, AIFF, and RA; and a suitable file size limit may be 10 Mb.

The type/format and size of video files which can be added to the information content 24 may be limited. For example, suitable image file formats may include: AVI, MOV, WMV, MPG (MPEG), M1V, MP", MPA, MPE, ASF, FLV, SWF, and RM; and a suitable file size limit may be 10 Mb.

The type/format and size of image files which can be added to the information content 24 may be limited. For example, suitable image file formats may include: GIF, JPG (JPEG), BMP, PNG, EPS, PSD, and TIF (TIFF); and a suitable file size limit may be 5 Mb.

The type/format and size of supplementary files which can be added to the information content 24 may be limited. For example, suitable supplementary file formats may include: TXT, DOC, PDF, XML, XLS, PPT and RTF; and a suitable file size limit may be 1 Mb.

There may be a total file size limit (i.e. an accumulated maximum file size) and a suitable limit may be 26 Mb.

The title fields 58, 61, 66, 69 may each have a maximum character limit and this may be 300 characters. The release body field 59 may have a maximum character limit and this may be 11000 characters. The boilerplate field 71 may have a maximum character limit and this may be 1500 characters. The release summary field 72 may have a maximum character limit and this may be 600 characters. The SEO keywords field 73 may have a maximum character limit and this may be 250 characters. A field for entering relevant URLs may have a maximum character limit and this may be 250 characters.

After an information content generator 23 has generated information content 24 and input that information content into the information content distribution process 26 (as described above), the information content is analysed 25.

Figure 16:
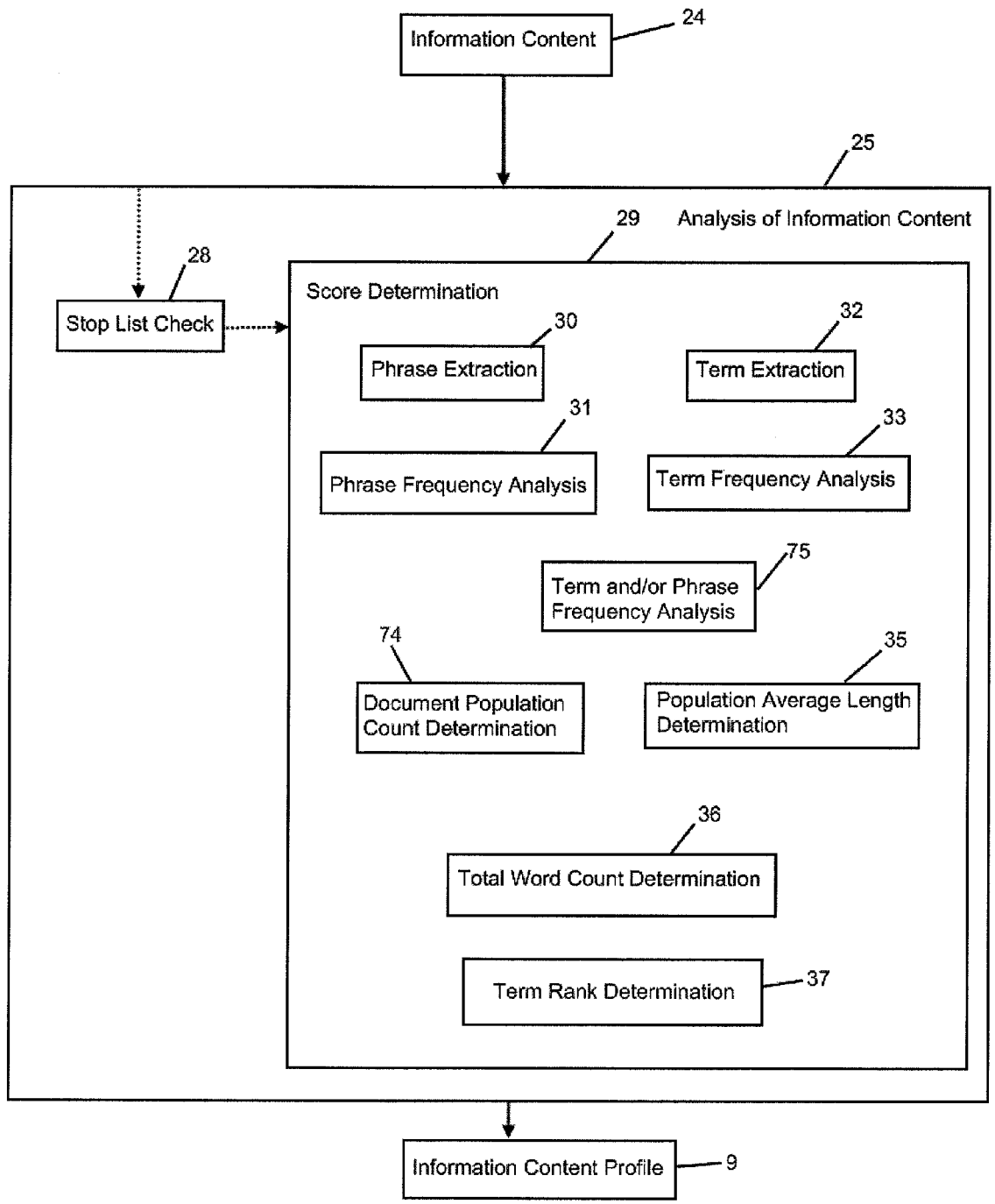
FIG. 16 shows aspects of an analysis process.

The analysis of the information content 24 is substantially similar to the analysis 5 of the harvested results from a potential recipient 2 as described above—see FIG. 16.

An initial step in the analysis 25 of the information content 24 may comprise the application of a stop list check 28 (as will be apparent, like referenced numerals will be used for like features). As described above, the stop list check 28 filters the information content so as to exclude certain common words from further analysis.

The information content (which may have already been passed through the stop list check 28) is then passed to a score determination process 29. As part of the score determination process 29, phrase 30 and/or term 32 extraction processes are performed on the information content 24 and the results of these extraction processes 30, 32 are passed to respective phrase 31 and term 33 frequency analysis processes.

The score determination process 29 for the information content 24 may also include a population average length determination process 35, a total word count termination process 36 and a term rank determination process 37 (all these processes have been described above in relation to the analysis of information content harvested from a potential recipient 2).

In addition, the score determination process 29 for the information content 24 may also include a document population count determination process 74 and a term and/or document frequency determination process 75.

The document population count determination process 75 comprises of process to determine the total number of documents in the population of documents being analysed. In other words, the information content 24 may comprise a plurality of documents which are each analysed as part of the information content 24 analysis process 25.

The term and/or document frequency determination process 75 is a process to determine the number of documents within the population of documents which contain the term and/or phrase which is being analysed.

The outputs from the processes involved in the score determination process 29 for the information content 24 are fed into equations in order to derive a release keyword score (RKS)—an example of a method of calculating the release keyword score is described below.

Initially, the relevant outputs may be fed into a chronological term rank (CTR) algorithm such as equation 1 above. The output from this algorithm along with the relevant outputs from the above processes may then be fed into a release key word score algorithm:

$$RKS = \ln\frac{dp - df + 0.5}{df + 0.5} \cdot \left(\frac{tf}{0.5 + 0.1 \cdot \frac{dl}{avdl}} + CTR\right) \quad \text{[Equation 4]}$$

In this equation:

dp, is the document population which is a total count of all the documents in the population of documents being analysed, and df, is the document term frequency which is the number of documents containing the term and/or phrase being analysed (the other variables are as described above).

As will be appreciated, in equation 4, the variable tf can be replaced with the variable pf in the case of the analysis of phrases rather than terms.

The list of phrases and/or terms along with the associated release key word score (RKS) is stored as the information content profile 9.

In an embodiment of an information content distribution process 26, the information content profile 9 is compared with recipient profiles 6 (which may be stored in a recipient profile database 8) to determine which of the potential recipients 2 are likely to be interested in the information content 24.

The process of determining which of the potential recipients 2 is likely to be interested in the information content 24 has been briefly described above in relation to FIGS. 2 and 3. These figures disclose an information content matching process 7. In accordance with an embodiment, the information content matching process comprises a matching or comparison process 10 in which the recipient profile 6 for each potential recipient 2 is compared with the information content profile 9. If a positive match is found, then the information content is sent 11 to the recipient 2 and if no match is found then the information content 24 is not sent 12 to the recipient 2.

An example implementation of the matching or comparison process 10 is described below.

Figure 17:
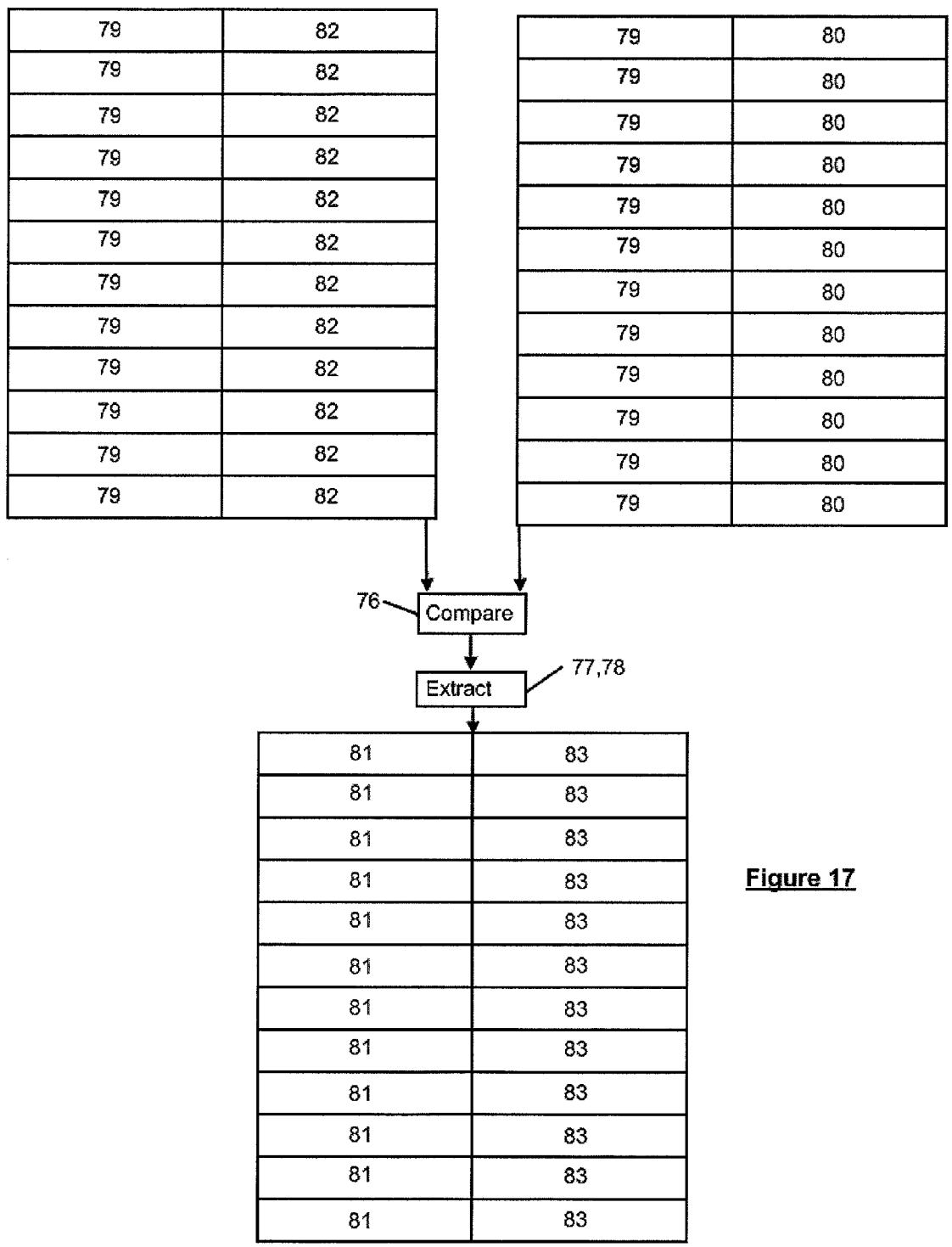
FIG. 17 shows aspects of an analysis process.

All of the terms and/or phrases 79 which are listed in the recipient profile 6 and in the information content profile 9 are compared 76 (see FIG. 17) in order to identify the terms and/or phrases 81 which are common to both the recipient profile 6 and the information content profile 9.

The receiver key word rank scores 80 which are stored in the recipient profile 6 in relation to respective common terms and/or phrases 81 which are also found to be present in the information content profile 9 are extracted 77. Similarly, the release key word scores 82 which are stored in the information content profile 9 in respect of each term and/or phrase 81 which was identified as being in common with the recipient profile 6 are also extracted 78.

For each term and/or phrase 81 which is found to be common to both the recipient profile 6 and the information content profile 9, the receiver keyword rank score 80 and the release keyword score 82 are multiplied to provide a receiver release keyword score 83 in accordance with equation 5 below:

$$RRKS = RKRS \cdot RKS \quad \text{[Equation 5]}$$

In this equation:
RRKS, is the receiver release keyword score,
RKRS, is the receiver keyword rank score, and
RKS, is the release keyword score.

A receiver release total keyword score 84 is also calculated. The receiver release total keyword score 84 is determined by the sum of the receiver release key word scores 83.

In an embodiment, the receiver release keyword scores 83 and receiver release total keyword scores 84 are only calculated for a portion of the terms and/or phrases 81 which are identified as being common to both the recipient profile 6 and the information content profile 9. In an embodiment, the receiver release keyword scores 83 are calculated for every term and/or phrase 81 which is found to be common to both the recipient profile 6 and the information content profile 9 but the receiver release keyword scores which are below a threshold level are discarded and are not used further in the matching process 10 and are not used to calculate the receiver release total keyword score 84.

The value of the receiver release total keyword score 84 is used to determine whether or not a match has occurred (and, therefore, whether or not to send 11 the information content 24 to the recipient 2).

Thus, in an embodiment, the receiver release total keyword score 84 is compared with a predetermined threshold value in order to determine whether or not a match has occurred. This threshold value may be dependent on the relevance threshold 13. The relevance threshold 13 may be set by a potential recipient 2 or may be set by operators of the information content matching process 7.

In an embodiment, the top 10% of the receiver keyword rank scores 80 for a particular potential recipient 2 (as stored in the recipient profile 6) are summed in order to arrive at a sub-total of the receiver keyword rank scores 80 for that potential recipient 2. This sub-total is then graduated in order to provide a plurality of possible threshold values for determining whether or not a particular receiver release total keyword score 84 has reached the required threshold in order for a match to be found.

The graduation may comprise the determination of ten threshold values. The first threshold value (relevance threshold number one) may be 30% of the sub-total of the receiver keyword rank scores 80. The last threshold value (relevance threshold number ten) may be 10% of the sub-total of the receiver keyword rank scores 80.

The graduation of the intermediate threshold values (i.e. numbers two to nine) may be in accordance with equation 6 below:

$$\text{Threshold value}_{SL} = Y\% - [(SL-1) \cdot (Y\% - Z\%)/(NSL-1)] \quad \text{[Equation 6]}$$

In this equation:
Y %, is the percentage of the sub-total of the receiver keyword rank scores 80 which forms the first level of the threshold (number one), in the present example this is 30% of the sub-total,
Z %, is the percentage of the sub-total of the receiver keyword rank scores 80 which forms the last level of the threshold (number ten), in the present example this is 10% of the sub-total,
SL, is a slider level or relevance threshold (and may take a value between 2 and 9), and
NSL, is the total number of slider levels or relevance thresholds (which is 10).

It will be appreciated that various different values are possible for NSL, Y % and Z %—the above values are given as an example only.

When a receiver release total keyword score 84 is calculated and this value is greater than the threshold value as determined by a particular slider level or relevance threshold 13 (which is either set by the potential recipient 2 or an operator of the information content matching process 7), then the information content 24 is sent 11 to the recipient 2. If no match is found (i.e. the value is less than the threshold value) then the information content 24 is not sent 12 to the recipient 2.

It will be understood that a potential recipient may be provided with a graphical user interface 51—as described above—such that the potential recipient 2 can alter the relevance threshold 13.

As discussed above, a recipient profile 6 may include a white list 47, a trust list 48, an ignore list 49 and a black list 50. The terms and/or phrases which are listed in each of these lists 47, 48, 49, 50 may have an impact on the receiver release total key word score 84. As mentioned above, terms and/or phrases on the trust list 48 which appear in the list of common terms and/or phrases 81 may have their respective receiver release key word scores increased by a first relative amount—for example 10%.

Similarly, terms and/or phrases which are present in the white list 47 and which are found in the list of common terms and/or phrases 81 may have their respective receiver release key word scores 83 increased by a second relative amount (which is generally less than the first relative amount—for example 2%). It may be that multiple 2% increases in the receiver release key word score 83 for a particular term or phrase 81 are implemented (for example up to a maximum of 10%)—as is explained in more detail below.

Common terms and/or phrases 81 which are listed in the ignore list 49 have respective receiver release key word scores 83 which remain the same.

Common terms and/or phrases 81 which are also listed in the black list 50 have their respective receiver release key word scores 83 reduced by a third relative amount. The third relative amount is preferably the same as the second relative amount (but is a reduction rather than an increase in the score). For example, the third amount may be 2%. Again, a plurality of applications of the reduction in the receiver release key word score 83 may be applied up to a maximum value (which may be 10%).

Feedback Process

A feedback process 15 has been described above, briefly, in relation to FIG. 5. Accordingly, a feedback process 15 generally comprises a recipient 2 being directed 17 to a feedback system 18 in which recipient input 19 is received and the recipient profile 6 updated 20 to provide an updated recipient profile 21.

In some embodiments, a feedback process 15 is provided in which the recipient 2 is not directed 17 to a feedback system 18. Instead, the feedback process 15 relies on automatically generated feedback information in order to update 20 the recipient profile 6 and output an updated recipient profile 21.

Figure 18:
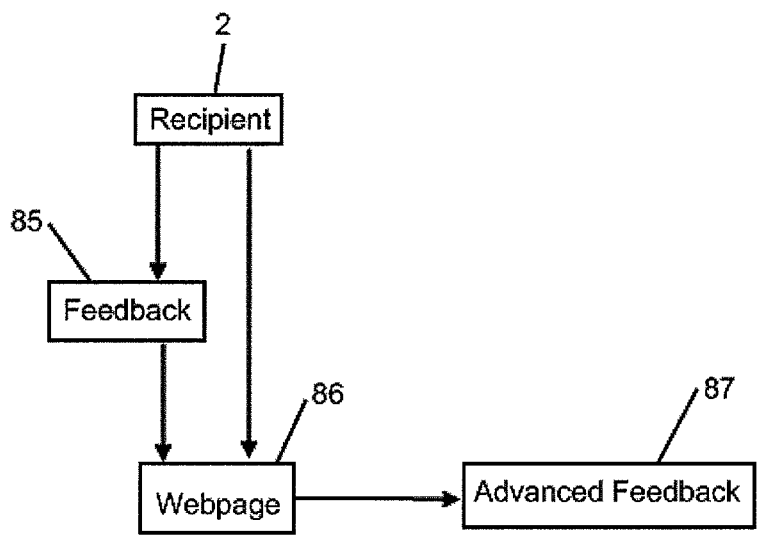
FIG. 18 shows aspects of a feedback process.

In an example of a negative feedback process (see FIG. 18 which shows a generic feedback process which may be a positive or a negative feedback process), a recipient 2 is sent 11 information content 24. The recipient 2 generates feedback 85 which is negative (in this case).

The recipient 2 may be directed 86 to a webpage through which the recipient 2 is, preferably, thanked for their feedback 85 and shown a graphical user interface 51 which allows the recipient 2 to adjust the relevance threshold 13 associated with their recipient profile 6. The recipient 2 may be instructed on the use of the graphical user interface 51 and may be provided with an opportunity to generate advanced feedback 87.

In the case of this negative feedback process it is assumed that the recipient 2 does not take the opportunity to provide advanced feedback 87.

The feedback system 18, therefore, obtains and stores the terms and/or phrases 79 from the relevant information content profile 9. These terms and/or phrases 79 are compared with terms and/or phrases which have been stored and associated with the recipient profile 6 for the potential recipient 2 concerned. In cases in which a term and/or phrase 79 is common to both the information content profile 9 for the current information content 24 and the terms and/or phrases 79 which were stored from previous negative feedback results, those terms and/or phrases 79 are added to the black list 50.

As discussed above, terms and/or phrases 79 which appear in the black list 50 are negatively weighted in future matching processes 10. In an embodiment, a term and/or phrase 79 must appear at least a predetermined number of occasions in the stored terms and/or phrases 79 associated with negative feedback for a particular recipient 2 before the term and/or phrase 79 is added to the black list 50. In an embodiment, there must be three occurrences of a term and/or phrase 79 before that term and/or phrase 79 is added to the black list 50. Each additional occurrence of the term and/or phrase 79 in an information content profile 9 associated with information content 24 which has been given negative feedback, will result in an additional negative weighting. There may be a maximum negative weighting which can be applied to any term in the black list 50. This maximum negative weighting may be 10%.

A positive feedback process is described below. However, it would be appreciated that a term and/or phrase 79 which is in the black list 50 associated with a particular potential recipient 2 may receive a positive weighting such that terms and/or phrases in the black list 50 may have their weighting increased or decreased for the purposes of the matching process 10 in accordance with the negative and positive feedback processes. If a term and/or phrase 79 in the black list 50 has a zero or positive weighting, then the term and/or phrase 79 is removed from the black list 50.

If the recipient 2 decides to provide advanced feedback 87 then the recipient 2 may select terms and/or phrases 79 from a list of terms and/or phrases associated with the information content 24 and forming part of the information content profile 9 for that information content 24. The recipient 2 may select one or more terms and/or phrases 79 in which they have no interest and these terms and/or phrases 79 may be added to the ignore list 49.

The information content distribution process 26 may allow a recipient 2 to adjust the content of the ignore list 49 at any time.

A positive feedback process is similar to the negative feedback process discussed above. However, instead of terms and/or phrases 79 being allocated a negative weighting, the terms and/or phrases are allocated a positive weighting—as discussed above—thus, terms and/or phrases 79 may be added to white list 47.

Similarly, an advance positive feedback process may be provided which corresponds with the advance negative feedback process but in which a recipient 2 selects terms and/or phrases 79 which, instead of being placed in the ignore list 49 are placed in the trust list 48.

If a recipient 2 attempts to provide feedback which would result in a term and/or phrase 79 from the trust list 48 being added to the ignore 49 or black 50 list, then a warning may be issued to the recipient 2.

If a recipient 2 attempts to provide feedback which would result in a term and/or phrase 79 from the black list 50 being added to the trust 48 or white 47 list, then a warning may be issued to the recipient 2.

Further Aspects of Embodiments

The use of a industry category 46 in a recipient profile 6 is discussed above in relation to the generation of a recipient profile 6 for a potential recipient 2 for whom limited or insufficient information content is available for analysis.

In addition, in an embodiment, the industry category 46 may be used to as part of the matching or comparison process 10 of the information content matching process 7. This can be used, for example, to match an information content profile 9 to a recipient profile 6 even if the matching or comparison process 10 described above does not result in a match. Thus, the industry category 46 can be used in a process which seeks to ensure that potential recipients 2 receive information content 24 which is relevant to their industry category—for example.

Figure 19:
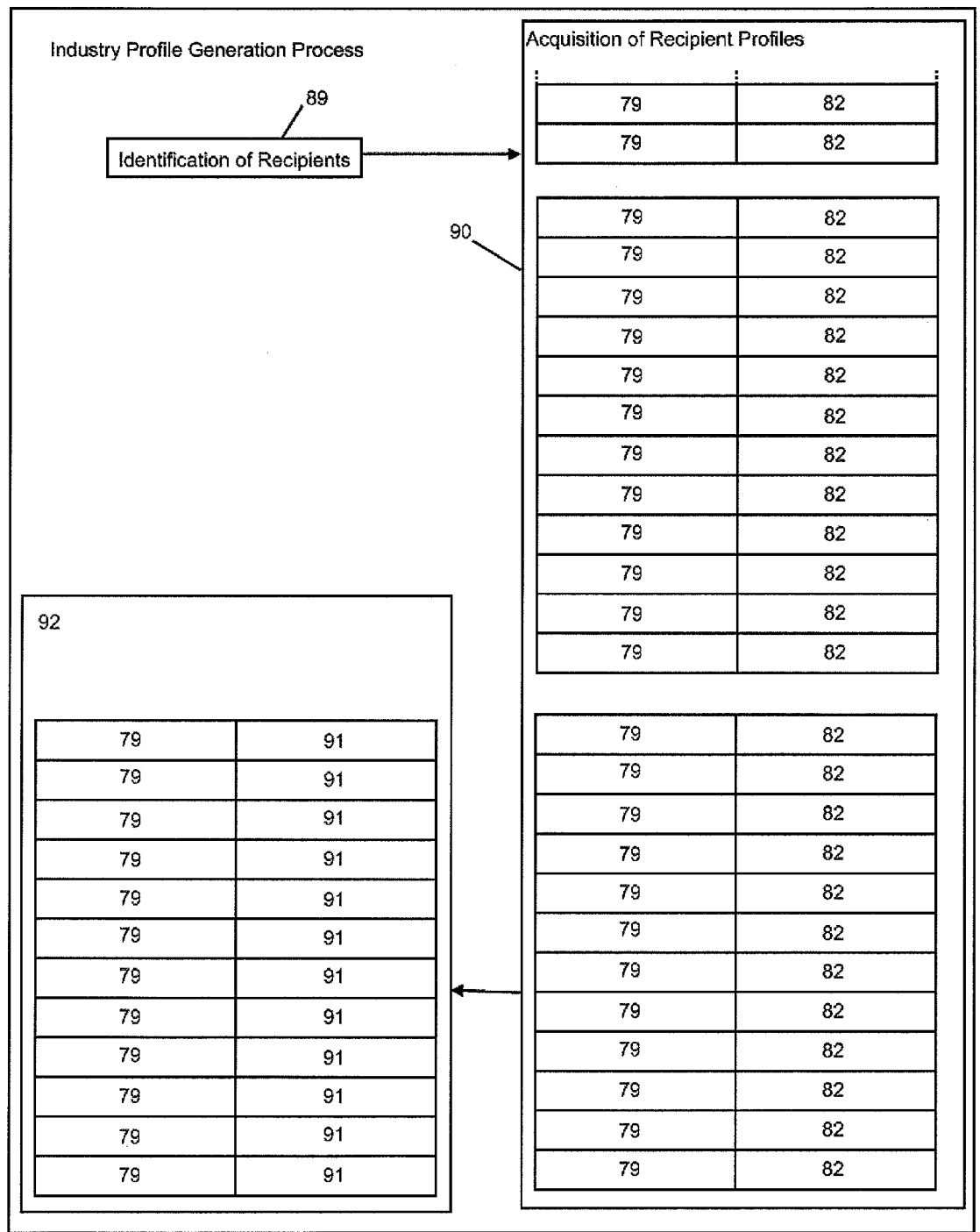
FIG. 19 shows aspects of an industry profile generation process.

An embodiment includes an industry profile generation process 88 (see FIG. 19). The industry profile generation process 88 produces a profile for an industry category 46 based on the recipient profiles 6 of the potential recipients 2 who are associated with that industry.

Thus, the industry profile generation process 88 may comprise the identification 89 of one or more potential recipients 2 associated with an industry. This identification 89 process may be based on industry categories 46 which were entered by the potential recipient 2 as discussed above.

For the identified potential recipients 2, the respective recipient profiles 6 are acquired 90. The list of terms and/or phrase 79 which forms part of the recipient profiles 6 along with the respective receiver keyword rank scores 80 are then combined. The receiver keyword rank scores 80 for a term and/or phrase 79 which is common to more than one of the recipient profiles 6 are summed to provide an industry keyword rank score 91 for that term or phrase 79.

The resultant list of terms and/or phrases 79 and their respective industry keyword rank scores 91 form an industry profile 92 for that industry.

Figure 20:
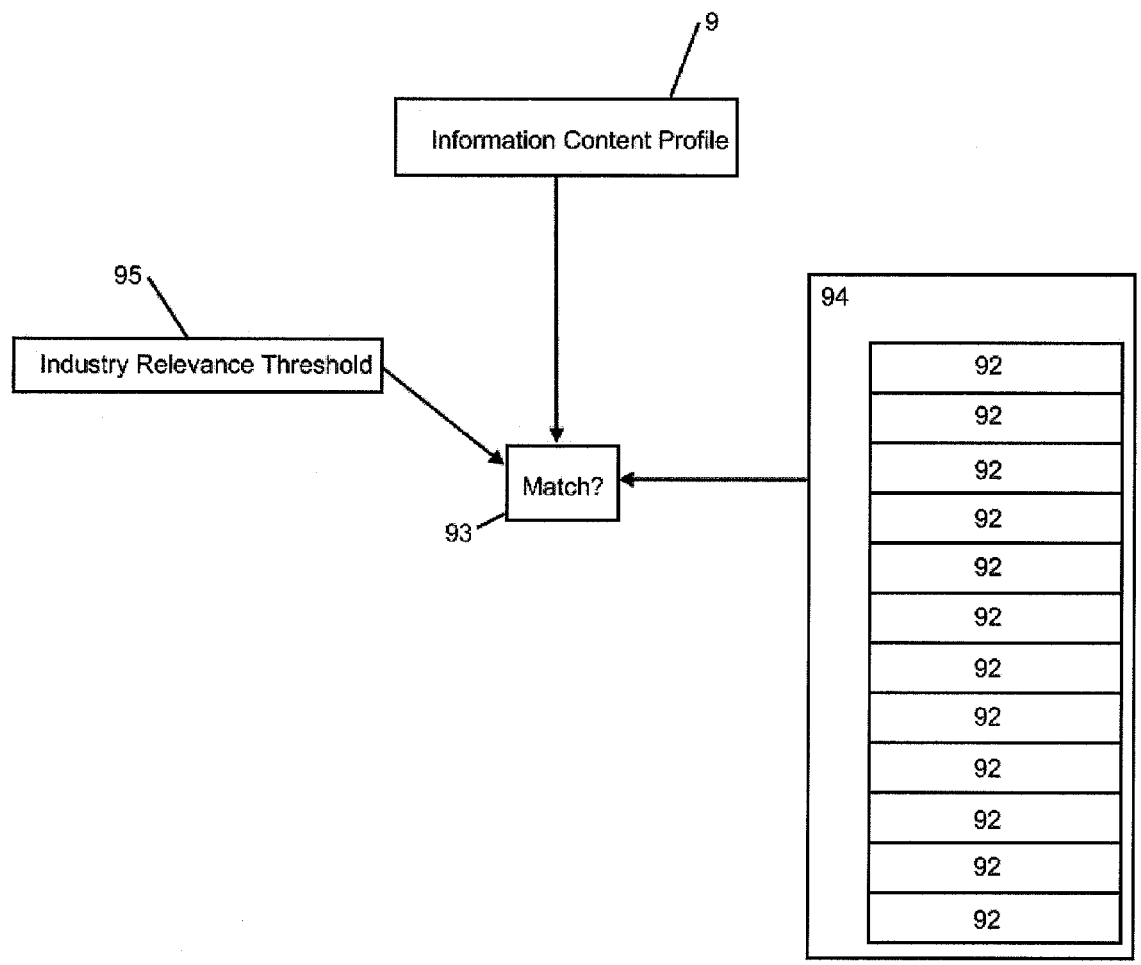
FIG. 20 shows aspects of an analysis process.

In an embodiment, an information content profile 9 for information content 24 is passed to a matching or comparison process 93 (see FIG. 20). An industry profile database 94 may be provided which stores a plurality of industry profiles 92 each of which is associated with an industry. The industry profile database 94 may feed industry profiles 92 into the matching or comparison process 93. The matching or comparison process 93 may operate in a similar manner to matching and comparison process 10. If a match is found between an information content profile 9 and an industry profile 92, then the information content 24 associated with the information content profile 9 is identified as being potentially interesting to the industry associated with the industry profile 92.

The matching or comparison process 93 comprises the generation of a release industry score for each term and/or phrase 79 using the equation shown below:

$$RIS = RKS \cdot IKRS \qquad \text{[Equation 7]}$$

In this equation:
RIS, is the release industry score,
RKS, is the release keyword score, and
IKRS, is the industry keyword rank score.

A total release industry score is also calculated and is the sum of the release industry scores for the terms and/or phrases 79. In an embodiment, the total release industry score is the sum of a portion of the release industry scores. In an example embodiment, the total release industry score is the sum of the top 10% of the release industry scores in that industry profile 92.

An industry relevance threshold 95 is used by a matching or comparison process 93 in a similar manner as the relevance threshold 13 is used by the matching and comparison process 10.

The industry relevance threshold 95 may be set by an operator of the matching and comparison process 10.

Thus, in an embodiment, the release industry score is compared with a predetermined threshold value in order to determine whether or not a match has occurred. This threshold value may be dependent on the industry relevance threshold 95.

A portion of the industry keyword rank scores are summed. This portion may be the top 10% of the industry keyword rank scores.

The summed total of the portion of the industry keyword rank scores are then graduated in order to provide a plurality of possible threshold values for determining whether or not a particular release industry score has reached the required threshold in order for a match to be found.

The graduation may comprise the determination of ten threshold values. The first threshold value (relevance threshold number one) may be 30% of the summed total of the portion of the industry keyword rank scores. The last threshold value (relevance threshold number ten) may be 10% of the summed total of the portion of the industry keyword rank scores.

The graduation of the intermediate threshold values (i.e. numbers two to nine) may be generally in accordance with equation 6 above—with the relevant variables for this process (as will be appreciated).

When a release industry score is calculated and this value is greater than the threshold value as determined by a particular industry relevance threshold 95, then the information content 24 is classified as being from the associated industry.

As will be appreciated, information content 24 may be associated with a plurality of industries.

The industry or industries which are determined by this process may be stored in the information content profile 9 for that information content 24.

The industry or industries which are determined by this process may then be compared to the industry category 46 associated with a potential recipient 2 as part of the matching or comparison process 10.

Once a potential recipient 2 has received a predetermined number of information content 24 documents which have been classified into a particular industry category (in accordance with the information content matching process 7 described herein), that industry category is added to the industry categories 46 which are stored in that recipient's recipient profile 6.

In an embodiment, the industry category of an information content 24 document is used compared 10 against the industry category or categories 46 which are stored in the recipient profile 6 for each potential recipient 2. If a match is found, then the information content 24 is sent to the potential recipient 2. Thus, the comparison of the terms and/or phrases 79 listed in a recipient's recipient profile 2 with those in the information content profile 9, to arrive at a receiver release keyword score 83 in accordance with the matching or comparison process 10 discussed above, need not be performed unless the recipient profile 2 for a potential recipient 2 does not include an industry category 46. This reduces the number of occasions on which the comparison of the terms and/or phrases 79 listed in a recipient's recipient profile 2 with those in the information content profile 9, to arrive at a receiver release keyword score 83 in accordance with the matching or comparison process 10 discussed above, need be performed.

Aspects of embodiments which relate to the use of an industry category 46 or industry categorisation may collectively be known as a categorisation process and aspects of embodiments which relate to the use of industry categories 46 in a matching or comparison process 10 in order to determine whether 11 or not 12 information content 24 is sent to a potential recipient 2 may be known, collectively, as a release categorisation system.

An embodiment comprises an industry specific information feed, such as an RSS feed. In such an embodiment, an information feed contains references to submitted information content which has been classifies (as discussed above) into an industry category. The information feed may be provided over the internet (a wide area network) or a local area network (for example, to the users of a company or corporation's computer network). The information feed may allow subscription thereto—as is possible in relation to RSS feeds and Atom feeds. The information feed may be provided through a server operated or controlled by the operator of an information content distribution process 26. A plurality of information feeds may be provided.

It will be appreciated that information content 24 may be matched with an industry category through the matching or comparison process which is described above. As such, an industry relevance threshold 95 may be set for the formation of the or each information feed. The relevance threshold for one information feed (for example, relating to one industry category) may differ from that of another information feed. Thus, an industry which has typically has relatively specific interests may have a different industry relevance threshold 95 than an industry which typically has relatively broad interests.

Figure 21:
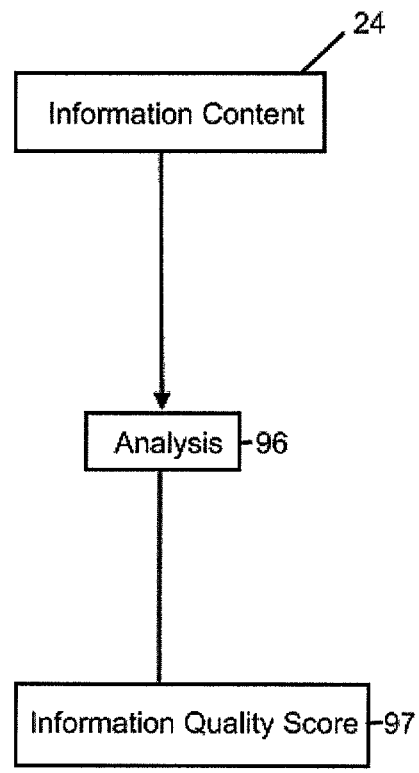
FIG. 21 shows aspects of an information quality score generation process.

In an embodiment (with reference to FIG. 21) information content 24 which is submitted as described above is analysed 96 to generate an information content quality score 97. The information content quality score 97 provides an indication of the perceived quality of the information content 24 which has been submitted.

Various different quality measures are envisaged for use in the analysis 96.

The information content quality score 97 may be a score with a maximum of one hundred points. The allocation of points to the score 97 may include consideration of various factors each of which is associated with a total maximum number of points. The factors may include one or more of: title length, body length, multimedia presence, related links presence, type of release, content details presence, and boilerplate presence.

One example distribution of points is:
title length: 30 points;
body length: 20 points;
multimedia presence: 10 points;
related links presence: 10 points;
type of release: 10 points;
content details presence: 10 points; and boilerplate presence: 10 points (total 100 points).

The each score (e.g. title length, body length, etc.) may be determined in accordance with a respective score calculation process.

The title length score calculation process may comprise awarding the maximum number of points (30 in the above example) if the title is a predetermined number of characters or fewer than this number (e.g. 70 characters). A portion of a point may be subtracted from the total possible score for each character over the predetermined number (up to a point at which the score reaches zero). The portion of a point which is subtracted for each additional character may be the same for each character over the predetermined number or may increase as the number of characters over the predetermined number increases. The total number of characters required in order to receive a score of greater than one may be set (e.g. 200 characters).

A similar score calculation process may be applied to the body length score. In this case an example of the predetermined number of characters is 1750 and a maximum number of characters to receive a score of greater then zero may be 10000 characters.

For the scores relating to the presence of multimedia and related links may be calculated in accordance with a score calculation process in which a score is added for each multimedia item (e.g. image or video) which is included in the information content 24 until the maximum score for has been reached. Thus, for example, if the presence of each multimedia item causes the addition of five points, with a maximum of ten possible points, the maximum score for the presence of multimedia can be reached by the presence of two or more multimedia items. In the case of related links, the presence of each related link may cause the addition of two and a half points, with a maximum score of ten possible points, four or more related links in the information content 24 will cause the maximum score to be reached (i.e. ten).

For other scores, the score calculation process may be binary—the presence of the required information in the information content 24 may result in allocation of the maximum score for that criterion.

Different types of information content 24 may receive different scores. For example, a press release may receive an allocation of five points and a social media news release (SMNR—a release specifically designed for distribution over the internet) may receive ten points.

The results of the information quality analysis may be output and displayed to the information content generator 23 or other party who submitted the information content 24. In addition, advice may be provided as to how the information content 24 can be improved (for example, "Adding multimedia to your release will help to increase your information quality score"). The information content generator 23 or other party who submitted the information content 24.

Figure 22:
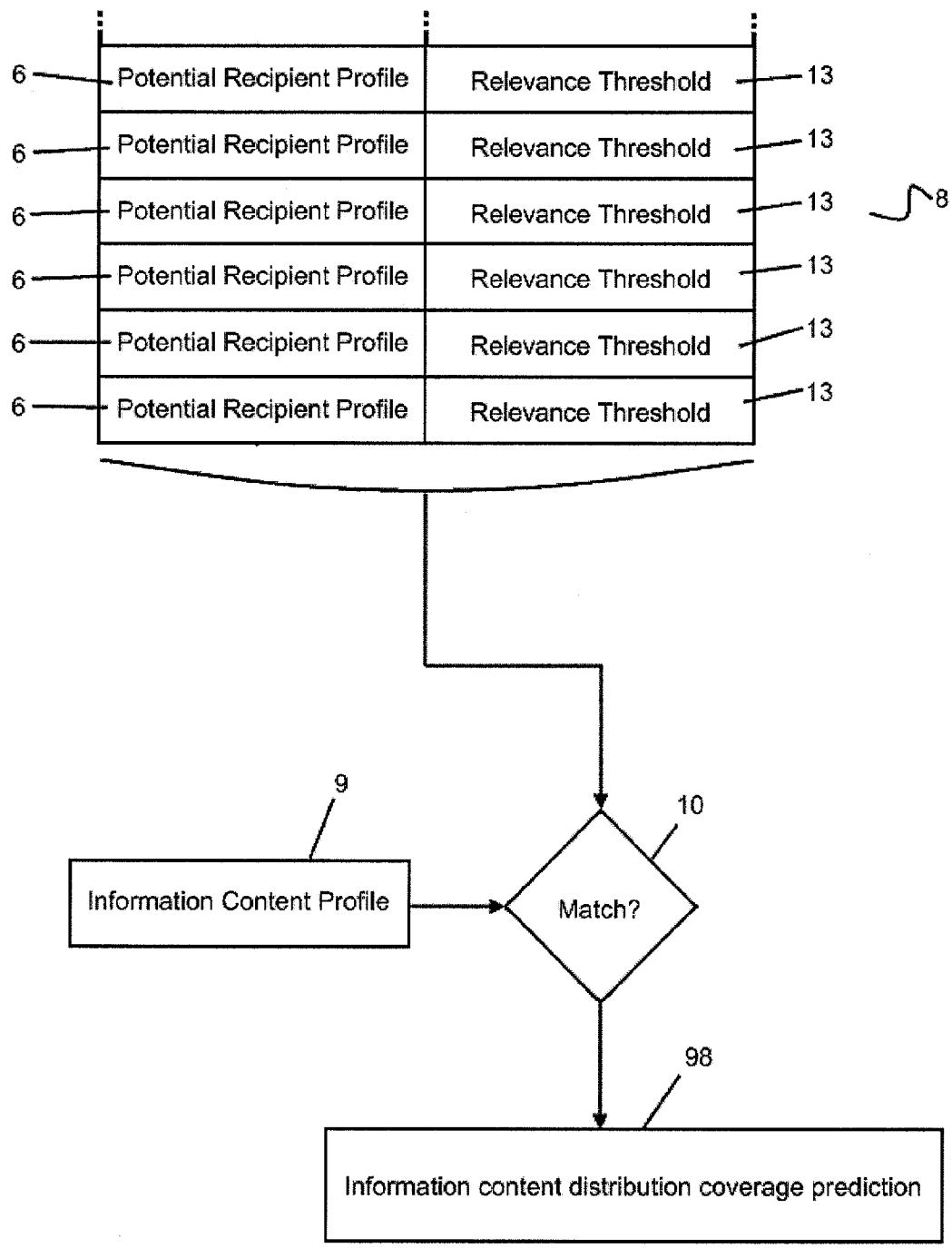
FIG. 22 shows aspects of a coverage predication process.

In an embodiment, an information content distribution coverage prediction 98 (see FIG. 22) may be determined. The information content coverage distribution coverage prediction 98 is generated by performing an information content distribution process 7 as discussed above with the exception that the information content 24 is not sent 11 to any potential recipients 2; instead, the total number of matched recipient profiles 6 (be that by the use of terms and/or phrases, industry categories, or both) is recorded and output as the information content distribution coverage prediction 98. This prediction 98 may be displayed to an information content generator 23 or other party submitting information content 24.

Thus, a party (such as an information content generator 23) may, in an embodiment, be provided with an indication regarding the number of potential recipients 2 who have been identified as being potentially interested in the information content 24 and to whom the information content 24 will be sent 11 if the party decides to proceed.

Other information may also be provided as part of the information content distribution coverage prediction 98 such as the industries which have been identified as being potentially in the information content 24 and/or an indication of the geographical locations of the identified potential recipients 2 (each recipient profile 6 may include a geographical location—such as a continent, country, county/state, town/city, and/or district). Thus, a party submitting information content 24 for distribution may be provided with an indication of the geographical coverage which can be achieved.

Figure 23:
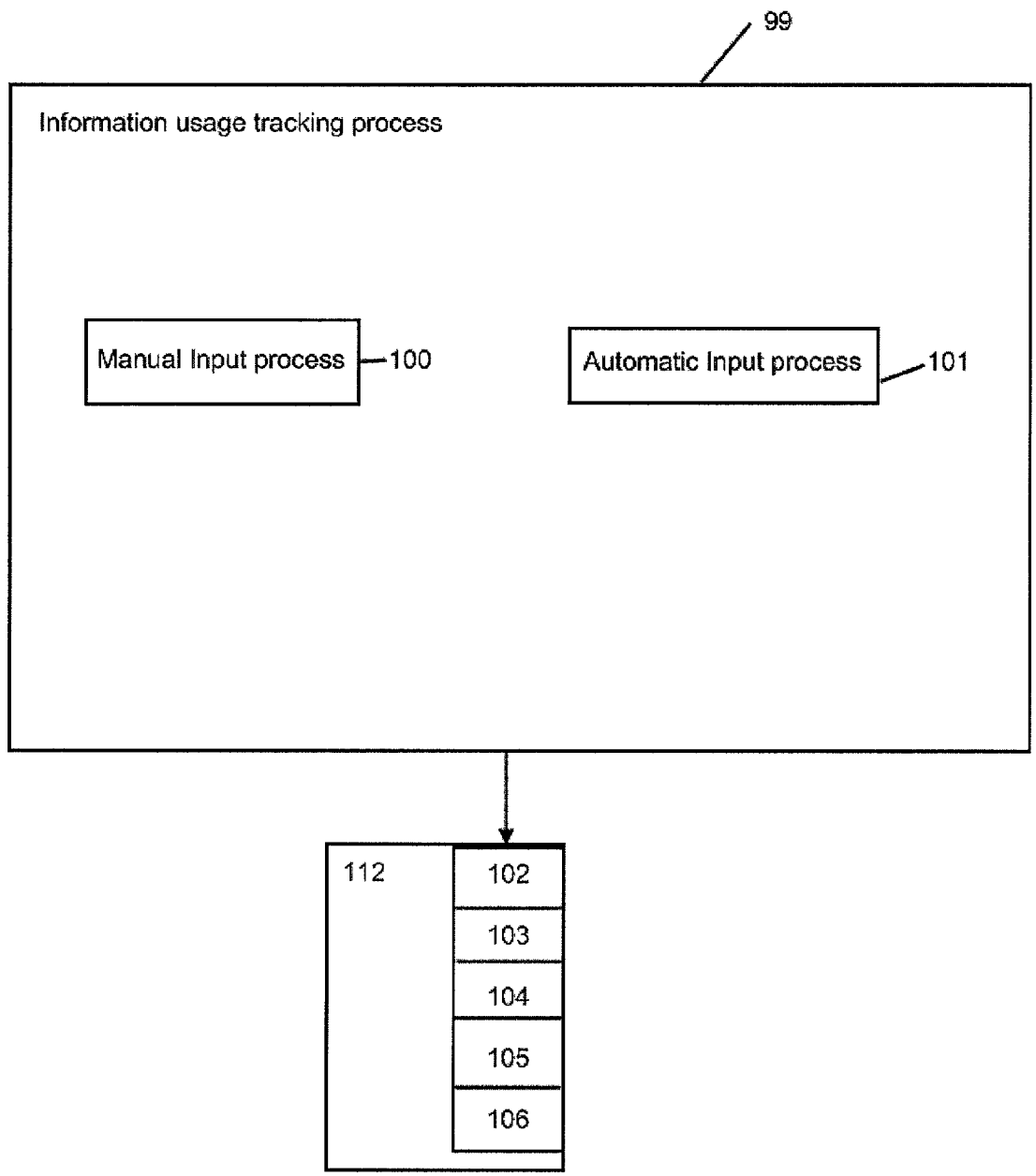
FIG. 23 shows aspects of an information usage tracking process.

In accordance with an embodiment, a process 99 (see FIG. 23) is provided which is configured to track a recipient's 2 use of information content 24 which has been sent to that recipient 2. This process 99 may be generally known as an information usage tracking process 99.

The information usage tracking process 99 may include a manual input process 100 and an automatic input process 101.

The information usage tracking process 99 is configured to determine different forms of information content 24 uses. These different uses include one or more of: editorial usage 102, selective usage 103, non-selective usage 104, blog usage 105, and recipient generated usage 106.

Editorial usage 102 is typically usage of information content 24 by a recipient 2 who generates their own content about the information content 24.

Selective usage 103 is typically usage of information content 24 by a recipient 2 who selectively uses information content 24 which they have been sent 11.

Non-selective usage 104 is typically usage of information content 24 by a recipient 2 who uses substantially all information content 24 which they have been sent 11—for example, the recipient 2 may re-publish the information content 24 on their own website.

Blog usage 105 is typically usage of information content 24 by a recipient 2 on the recipient's 2 blog.

Recipient generated usage 106 is typically usage of information content 24 by a recipient 2 in the generation of their own information content and is similar to the editorial usage 102.

As will be appreciated, information content 24 may be used by a recipient 2 in a manner which falls into more than one of the above categories 102,103,104,105,106.

Figure 24:
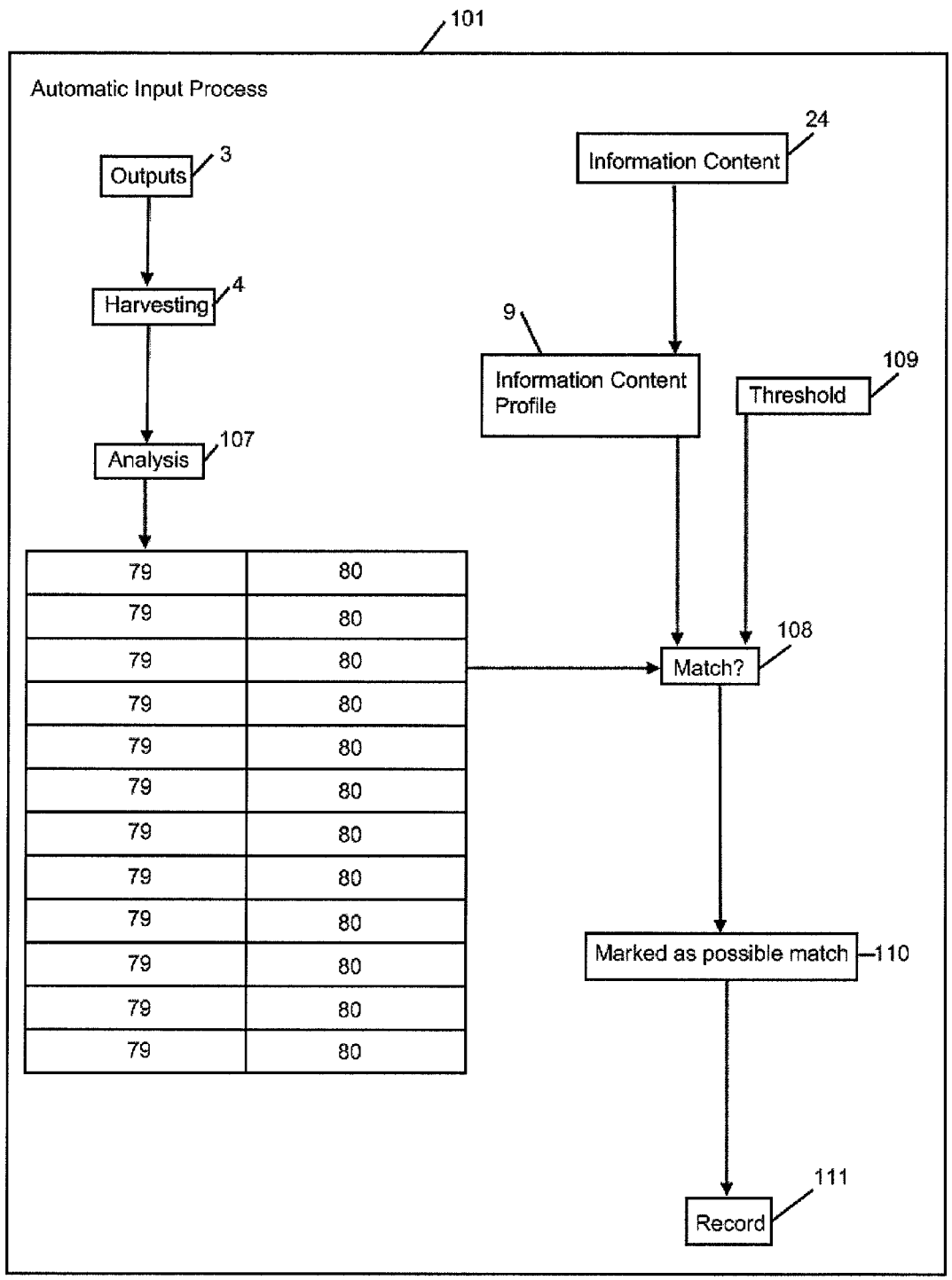
FIG. 24 shows aspects of an automatic input process.

The automatic input process 101 may monitor the information content 3 which is output by a recipient 2 for a predetermined period after that recipient 2 has been sent information content 24. This may be achieved in a similar manner to the recipient profile generation process 1 above. For example, the outputs 3 from a recipient 2 may be harvested 4 and analysed 107—see FIG. 24. The analysis 107 results in the generation of a list of terms and/or phrases 79 along with respective receiver keyword rank scores 80—as described above. The release keyword scores 82 are already known from the processes which were performed (and which are described above) prior to the sending 11 of information content 24 to one or more recipients 2. Indeed, the information content profile 9 for the distributed information content 24 is already known.

The information content profile 9 is matched or compared 108 in a manner which is comparable to the matching or comparison process 10 discussed above. A relevance threshold 109 may be set (as discussed above in relation to relevance threshold 13). If there is a match between an information content profile 24 and harvested 4 and analysed 107 results (i.e. the degree of match exceeds the threshold—see above for more details), then the information content document 3 is marked 110 as a potential match.

A record 111 of these potential matches may be kept.

The automatic input process 101 may classify the information content document 3 which has been marked 110 as a potential match into the above described categories 102,103,104,105,106 based on the type of information content document 3 (e.g. blog, website news article etc) and the level of the match. If a very high match has been found, then this may be an indication that the information content 24 has been re-published by the recipient 2 as the information content document 3 without editing. A lesser degree of match may indicate that the information content document 3 is based on (but not a direct copy of) the information content 24.

The record 111 may form an input into the manual input process 100. An operator may then review the information content documents 3 which were identified by the automatic input process 101 to determine if there is, indeed, a match and/or to classify the information content document 3 as discussed above.

The record 111 may store an identifier for the information content 24 (such as an identification code), an identifier for the recipient 2 (such as an identification code), an alternative identifier for the recipient 2 (such as a name), a title of the information content document 3, and a URL for the information content document 3.

Information content usage results 112 may be generated by the information usage tracking process 99. These results 112 may comprise one or more of: the number of uses found by the automatic input process 101 and/or the manual input process 100, the categories 102,103,104,105,106 of the recorded usage of the information content 24, dates of the recorded usage, and the like.

The information content usage results 112 may be presented to the party who submitted the information content 24 for distribution.

In an embodiment, the outputs 3 of a potential recipient 2 are monitored for a predetermined period (e.g. two days) before information content 24 is sent to the recipient 2 such that more accurate results regarding the impact of the information content 24 can be gathered. In an embodiment, the outputs 3 of a potential recipient 2 are monitored for a predetermined period (e.g. seven days) after they have been sent the information content 24 to provide the usage results.

The information content document 3 may be the content of an information feed (such as a RSS feed) output by the recipient 2.

The information usage tracking process 99 can be used to validate the information content distribution coverage prediction 98. Thus, a party who as submitted information content 24 for distribution may be given feedback of the actual use of that information content 24 and this can be compared with the coverage prediction to determine a quality measure for the distribution. In an embodiment, the distribution of information content 24 is automatically given a score which represents a comparison of the predicted coverage 98 with the actual usage of the information content 24—the results may be graded. This information can then be used to provide predictions for actual usage based on future information content distribution coverage predictions 98.

In an embodiment, a process is provided which monitors information content distribution coverage predictions 98 with actual usage results. The process is configured to use historical matches in order to provide a predicted actual usage along with a predicted coverage. In an embodiment, this process is also configured to adjust the matching process 10, and/or the processes used to generate the profiles (such as the recipient and information content profiles) to provide better actual usage results in the future. This process is preferably an on going and iterative learning process which may be implemented using neural networking techniques or regression analysis. The adjustments may, for example, involve adjustments to the constants in the above equations or alterations to equations themselves.

Information content 24 which is submitted may be allocated a substantially unique identifier. Each potential recipient 2 may be allocated a substantially unique identifier. Each party who submits information content 24 may be allocated a substantially unique identifier (which may be the same identifier as the potential recipient identifier for that party). Information content documents 3 output by a potential recipient 2 may be allocated a substantially unique identifier. Records may be maintained of the information content 24 which is generated, who submitted that information content, who received the information content 24, who used that information content, and how that information content was used. These records may be used to provide statistical analysis of the operation of a distribution process 26 operating generally as described above.

Figure 25:
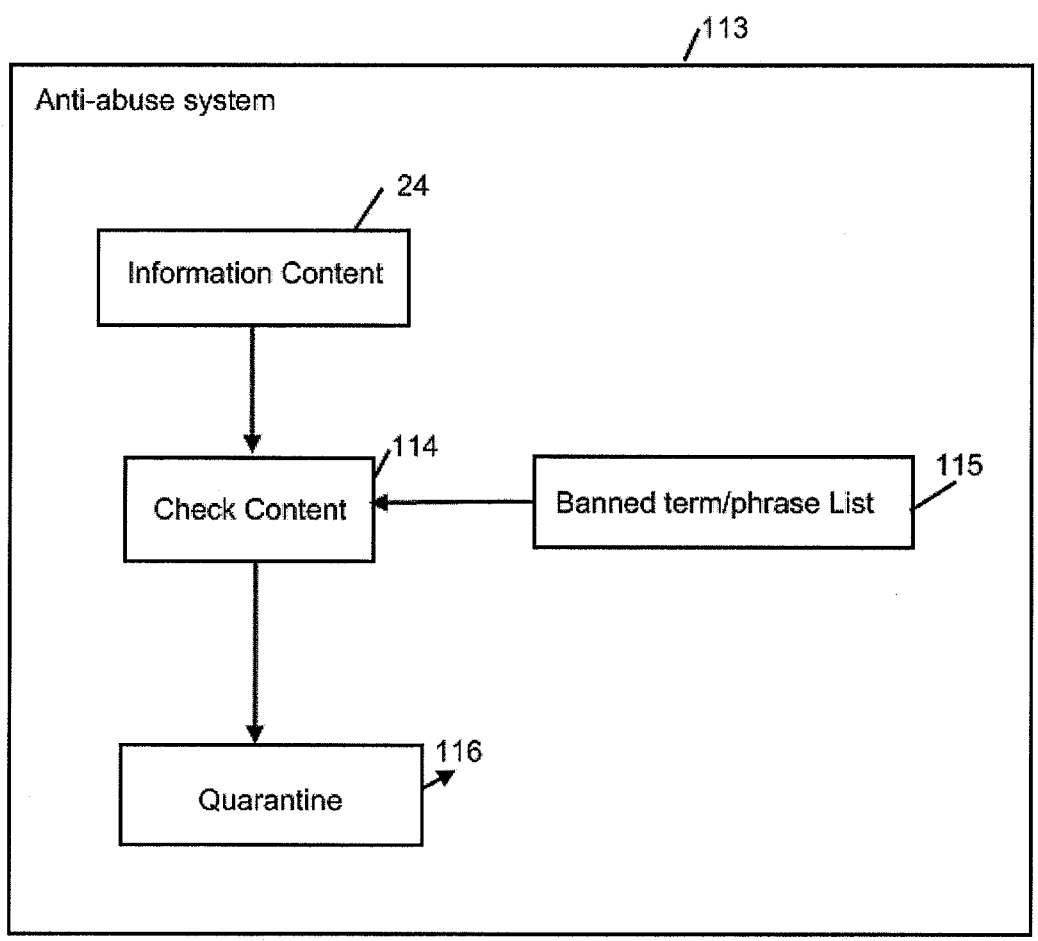
FIG. 25 shows aspects of an anti-abuse system and process.

In an embodiment, an anti-abuse process 113 is provided (see FIG. 25). The anti-abuse process 113 is configured to check 114 all information content 24 which is submitted for distribution against a banned term/phrase list 115. Any information content 24 which is found to include one or more of the terms and/or phrases in the banned term/phrase list 115 will be quarantined 116.

Quarantined information content 24 may be reviewed manually by an operator of the system 26. The operator may contact the party who submitted the information content 24 to inform them that the information content 24 cannot be distributed. In an embodiment, a party who submitted the information content 24 is automatically informed that the information content 24 has been quarantined 116.

Similarly, information content 24 may be quarantined 116 if the information content 24 uses the same term and/or phrase too many times. For example, if the same term and/or phrase constitutes more than 40% of the total number of terms and/or phrases in the information content 24 then this information content 24 may be quarantined 116.

Similarly, information content 24 may be quarantined 116 if the information content 24 does not include a sufficient number of unique terms and/or phrases. For example, if less than 40% of the terms and/or phrases in the information content 24 are unique then this information content 24 may be quarantined 116.

Applications of Aspects of Embodiments

It will be appreciated that embodiments of the present invention may be used to distribute information content 24 in the form of, for example, press releases or other articles to potentially interested recipients 2 in a targeted manner.

It will be appreciated that embodiments of the present invention may be used to target other information to potentially interest recipients. For example, emails to a company are often sent to a general email address, these incoming emails may be processed and forwarded to potentially interested recipients 2 within the company (whose email addresses may not be publicly available).

It will be appreciated that embodiments may be used to sort e-mails on a local or remote computer into those which are likely to be of interest and those which are unlikely to be of interest.

It will be appreciated that embodiments may be used to analyse information content based on the content of that document.

It will be appreciated that embodiments may be used to target information content at potentially interested recipients 2.

It will be appreciated that embodiments may be used to provide feedback of potential distribution coverage for information content before that information content is submitted for distribution.

It will be appreciated that embodiments of the present invention may be used to allow a party wishing to submit information content 24 to tailor that information content 24 to achieve the most appropriate level of coverage.

It will be appreciated that embodiments of the present invention provide a filtration system which reduces the quantity of information which is transmitted through a network. Thus, for example, communications may be more targeted and the strain on hardware resources greatly reduced.

It will be appreciated that embodiments of the present invention provide a filtration system which is configured to sort information content into a first or a second storage location based on the match (or lack of a match) between the information content and a likely interests of a recipient 2.

It will be appreciated that embodiments of the present invention may be used to generate collections of information content 24 which is of potential interest to a particular industry. This collection of information content 24 may be output as an information feed—such as a RSS or Atom feed.

Embodiments of the present invention seek to provide technical solutions to technical problems, such as excessive use of hardware resources in information transmission, the need to maintain privacy and security, by allowing the targeting of information content to potentially interested recipients wherein, in embodiments, the contact details of the potential recipients need not be provided to the party wishing to distribute information content.

Although the transmission and sending of information content 24 has been discussed herein, it will be understood that embodiments of the present invention may not transmit or send information content 24, as such, but may re-order, categorise, filter, display, organise, or present the information content 24 in some other manner. For example, in a list of available information content 24, each item in the list may be accompanied by an indication of the likelihood of that information content 24 being of interest to a particular potential recipient 2 or to potential recipients 2 in, for example, a particular industry. This indication may be a binary indication (i.e. of interest/not of interest) or may be a score representing the likelihood of the information content 24 being of interest or could be any other form of indication (e.g. a traffic light-type indication). As will be appreciated information content 24 may be transmitted to a potential recipient 2 and then presented to the recipient 2 or, for example, filtered or organised or re-ordered and then transmitted and/or presented to the recipient.

Yet Further Aspects of Embodiments

According to an aspect of an embodiment, equation 8 below is used in a process as described above instead of equation 2.

$$ReceiverKS = \frac{tf}{0.5 + 1.5 \cdot \frac{dl}{avdl} + tf} \cdot CTR \quad \text{[Equation 8]}$$

According to aspects of embodiments, equation 9a or 9b below is used in a process as described above instead of equation 4.

$$RKS = \ln\frac{dp - df + 0.5}{df + 0.5} \cdot \left(\frac{tf}{0.5 + 1.5 \cdot \frac{dl}{avdl} + tf} + CTR\right) \quad \text{[Equation 9a]}$$

$$RKS = \ln\frac{dp - df + 0.5}{df + 0.5} \cdot \left(\frac{tf}{0.5 + 1.5 \cdot \frac{dl}{avdl} + tf} \cdot CTR\right) \quad \text{[Equation 9b]}$$

An embodiment further comprises a context filter process. This process may occur after the receiver release keyword scores 83 have been calculated. This process may occur after the matching process.

According to the context filter process, a predetermined number of words/phrases may be selected—the selected words/phrases having the highest receiver release keyword scores 83. According to an embodiment, all of the words/phrases are selected.

For example the top five receiver release keyword 83 scored words/phrases may be selected:

| Receiver Word Match | RKRS | Release Word Match | Release Keyword Score | Receiver Release Keyword Scores |
|---|---|---|---|---|
| Some | 16.5517 | some | 1.057055 | 17.49605 |
| Partner | 6.594141 | partner | 2.606629 | 17.18848 |

| Receiver Word Match | RKRS | Release Word Match | Release Keyword Score | Receiver Release Keyword Scores |
|---|---|---|---|---|
| Make | 21.81457 | make | 0.738626 | 16.11281 |
| Search | 9.167579 | search | 1.676226 | 15.36693 |
| Top | 21.81708 | top | 0.704117 | 15.36178 |

According to an embodiment, the receiver release keyword score 83 does not occur prior to the content filter process.

The selected words/phrases are then analysed to determine the number of times that the word/phrase appears in information content on their own or in conjunction with each other.

|  | some | partner | make | search | top |  |
|---|---|---|---|---|---|---|
| Some | 6 | 3 | 2 | 1 | 2 | 14 |
| some + partner |  | 1 |  | 1 | 2 |  |
| some + partner + make |  |  | 2 | 1 | 3 |  |
| some + partner + make + search |  |  |  | 1 | 1 |  |
| Partner |  | 9 | 3 | 2 | 4 | 18 |
| partner + make |  |  | 2 | 1 | 3 |  |
| partner + make + search |  |  |  | 1 | 1 |  |
| Make |  |  | 10 | 2 | 3 | 15 |
| make + search | 1 |  |  | 1 | 2 |  |
| make + search + top | 1 |  |  |  | 1 |  |
| Search |  |  |  | 4 | 2 | 6 |
| search + top | 2 | 2 |  |  | 4 |  |
| Top |  |  |  |  | 12 | 12 |
|  |  |  |  |  |  | 82 |

The totals from the preceding step are then summed to give a combination count—for example:

| Duplicate combination | |
|---|---|
| 1 word/phrases | 41 |
| 2 words/phrases | 24 |
| 3 words/phrases | 11 |
| 4 words/phrases | 5 |
| 5 words/phrases | 1 |
| | 82 |

A context multiplier is calculated. In an embodiment, the context multiplier for a word/phrase on its own is 1 and for combinations of two or more words/phrases is determined by equation 10 below:

$$\text{Context Multiplier} = 2^P X \quad \text{[Equation 10]}$$

where P is a constant which may be 1 and X is the total number of words minus 1.

A context value is then calculated. In an embodiment, the context value is determined by equation 11:

Context Value = Combination Count(for a particular number of words/phrases).

Context Multiplier(for that number of words/phrases). [Equation 11]

For example:

| Duplicate combination | Context Multiplier | Power | Context value |
|---|---|---|---|
| 1 word/phrases | 41 | 1.0000 | N/A | 41.0000 |
| 2 words/phrases | 24 | 2.0000 | 1 | 48.0000 |
| 3 words/phrases | 11 | 4.0000 | 2 | 44.0000 |
| 4 words/phrases | 5 | 8.0000 | 3 | 40.0000 |
| 5 words/phrases | 1 | 16.0000 | 4 | 16.0000 |
|  | 82 |  |  | 189.0000 |
| Power factor = P |  | 1 |  |  |

In an embodiment, a receiver release context value (RRCV) is then determined using equation 12:

RRCV = Sum of the context value for each word/phrase combination [Equation 12].

In an embodiment, a final receiver release relevance score (RRRS) is calculated using equation [13]:

RRRS = ΣRRCV·RRKS for all matched words/phrases [Equation 13]

The matching/comparison process can then be implemented as above using a threshold value. It will be appreciated that the threshold value levels will need to be adjusted accordingly and that this may be achieved by selecting appropriate values for Y and Z in Equation 6.

It will be appreciated that the above described context filter could be implemented as part of a matching/comparing process without other aspects of the processes described above.

According to an embodiment, a phrase factor is used during the matching process to increase the perceived relevance of any matched phrases proportional to the length of that matched phrase.

The RRKS is multiplied by the phrase factor to produce a Phrase Matched Score. This is performed for any matched phrases of 2 or more words—in an embodiment.

The phrase factor may be calculated according to equation 14:

$$PF = PC^{(\text{Number of words in phrase}-1)} \quad \text{[Equation 14]}$$

where PF is the phrase factor and PC is a phrase constant which may be 2.

For example:

| Number of words in phrases | RKS | RKRS | Standard match score | Power | Phrase matched score |
|---|---|---|---|---|---|
| 1 | 4 | 3 | 12 | N/A | 12 |
| 2 | 4 | 3 | 12 | 1 | 24 |
| 3 | 4 | 3 | 12 | 2 | 48 |
| 4 | 4 | 3 | 12 | 3 | 96 |
| PC = | 2 |  |  |  |  |

The Phrase Matched Score is, in an embodiment, summed with the RRKS for single words to produce a revised receiver release total keyword score 84 and this is then used for the matching process.

In accordance with embodiments, the processes, systems and modules described herein include the processes, systems and modules—or parts thereof—as described in FIGS. 27, 28, and 29.

In accordance with embodiments, the processes, systems and modules described herein include the processes, systems and modules—or parts thereof—as described in FIGS. 30 and 31.

Still Further Aspects of Embodiments

A further aspect of embodiments provides a search query interface which allows a user to search information content 24 to identify information content which may be of particular interest to that user (as a potentially interested recipient 2).

Information content 24 is stored on one or more storage media—which may be local or remote storage media and/or may be distributed storage media.

The search query interface is presented to the user through a portal provided which may be provided over a network—such as the internet.

The search query interface is configured to receive a text string from the user (which may be input through an input device such as a keyboard or through a voice recognition system for example).

The text string is, in an embodiment, transmitted to a server which is remote from the user.

In an embodiment, the text string undergoes analysis which includes some or all of the same analysis steps generally as described above in relation to the analysis 5 of harvested results to produce a recipient profile 6 and/or the process 25 which generates the information content profile 9. The analysis preferable includes tokenisation 38 of the text string and extraction of one or more words or phrases and may include one or more of stemming 40, tagging 39, and normalisation 41.

The extracted words or phrases are converted from text to numeric identifiers by checking whether each word or phrase has previously been identified in either the harvested content 4 from user or the information content 24 to be displayed/distributed by looking up each word or phrase in a terms table (a table that stores every term (i.e. word or phrase) that has been extracted from either of these two data sets).

Words or phrases that do not appear in this terms table terms are ignored for the purpose of calculating a Search Relevance Score—as no match will be found in relation to these words or phrases in the information content 24.

The Search Relevance Score is calculated by assigning each identified word or phrase with a value of, for example, one.

The information content 24 is searched to identify information content 24 that includes at least one of the words or phrases identified within the text string. The information content 24 identified becomes the search corpus.

For each information content item 24 within the search corpus the Search Relevance Score (SRS) is calculated as described below:

Search Relevance Score=

For all matched terms $$[[\Sigma RKSs \text{ for SWMT}+(\Sigma RKSs \text{ for MWMT} \times MTC^{(A-1)})] \times SRC^B \times [(RTS+1)^{RTP}]] \quad \text{[Equation 15]}$$

wherein:
Single word matching terms=SWMT;
Multiple word matching terms=MWMT;
Number of words in MWMT=A;
Matching Terms Constant=MTC (e.g. 4);
Search Relevance Constant=SRC (e.g. 2);
Number of search query terms matched=B;
Number of Receivers to whom the Release has been matched and has passed their Relevance Threshold=RTS; and
Relevance Threshold Power=RTP (e.g. 0.5).

The search corpus is sent to the user, preferably through a web service interface, with the relevant SRS for each information content 24 item (i.e. Release). The information content 24 is presented to the user in reverse SRS score order—preferably with a summary or abstract representing each information content 24 item in the presented results (the user being able to "click-through" the summary or abstract to access the complete information content 24).

An example is shown below:

| Search query | apple iphone app |
|---|---|

Release where they all Match as Single Words, Two Word Terms and Three Words Term

| Term | Type | Release Keyword Score | Number of words in MWMT (A) | Score |
|---|---|---|---|---|
| Apple | SWMT | 2.00 | N/A | 2.00 |
| Iphone | SWMT | 1.50 | N/A | 1.50 |
| App | SWMT | 1.20 | N/A | 1.20 |
| apple iphone | MWMT | 2.00 | 2.00 | 8.00 |
| iphone app | MWMT | 2.00 | 2.00 | 8.00 |
| apple iphone app | MWMT | 1.70 | 3.00 | 27.20 |
|  |  |  |  | 47.90 |
| MTC | 4.00 |  |  |  |
| SRC | 2.00 |  |  |  |
| B | 6.00 |  |  |  |
| RTS | 43.00 |  |  |  |
| RTP | 0.50 |  |  |  |

Search Relevance Score 20,334.89

Release where they all Match as Single Words and as Two Word Terms, but not as a 3 Word Term

| Term | Type | Release Keyword Score | Number of words in MWMT (A) | Score |
|---|---|---|---|---|
| Apple | SWMT | 2.00 | N/A | 2.00 |
| Iphone | SWMT | 1.50 | N/A | 1.50 |
| App | SWMT | 1.20 | N/A | 1.20 |
| apple iphone | MWMT | 2.00 | 2.00 | 8.00 |
| iphone app | MWMT | 2.00 | 2.00 | 8.00 |
|  |  |  |  | 20.70 |
| MTC | 4.00 |  |  |  |
| SRC | 2.00 |  |  |  |
| B | 5.00 |  |  |  |
| RTS | 43.00 |  |  |  |
| RTP | 0.50 |  |  |  |

Search Relevance Score 4,393.86

Release where they all Match as Single Words but not as 2 or 3 Word Phrases

| Term | Type | Release Keyword Score | Number of words in MWMT (A) | Score |
|---|---|---|---|---|
| Apple | SWMT | 2.00 | N/A | 2.00 |
| Iphone | SWMT | 1.50 | N/A | 1.50 |
| App | SWMT | 1.20 | N/A | 1.20 |
|  |  |  |  | 4.70 |
| MTC | 4.00 |  |  |  |
| SRC | 2.00 |  |  |  |
| B | 3.00 |  |  |  |
| RTS | 43.00 |  |  |  |
| RTP | 0.50 |  |  |  |

Search Relevance Score 249.41

Embodiments may operate an exact query match process. For example, the user may submit the text string "apple iphone app".

This text string is processed substantially as discussed above; however, the text string is checked to see if all phrases within the text string (of 2 or more words) exist in the terms table ("apple iphone", "iphone app", "apple iphone app").

If any phrases do not appear in the terms table then a null result is generated and sent to the user.

If all phrases appear in terms table then the process proceeds substantially as discussed above; however, the only information content 24 items meeting the following criteria are sent to the user:

a) items which include all phrases b) items in which the phrases are adjacent to each other. For example, if there are three terms to match and the first term matched was ranked tenth, and the last term matched ranked twelfth, then the terms are together. If there are three terms to match and the first term matched was ranked tenth, and the last term matched ranked forty sixth, then the terms are not together.

The SRSs are calculated and the information content 24 items ordered substantially as discussed above.

Additional Applications and Functionality

The information content 24 used in accordance with embodiments of the present invention may be submitted by an information content provider directly to a module of an embodiment of the invention for the generation of an information content profile 9.

In embodiments, the information content 24 is passively harvested from a collection of available information content 24. For example, this collection may comprise a storage device or distributed storage device storing a plurality of information content 24 items. The storage device or distributed storage device may comprise one or more computers or data storage media attached to a computer. A distributed storage device may comprise a plurality of storage devices linked by a network such as the internet or a local area network. The storage device or distributed storage device may comprise an internet server or an email server or a part thereof.

In an embodiment, a location at which the information content 24 is located may provided and the information content 24 may be passively harvested from that location—the location may be an IP address, the location of a blog, the location of a social networking page in a social networking website, or the like, for example.

In an embodiment, the presence of new information content 24 at a location is periodically or continuously checked and new information content 24 is then processed to determine an information content profile 9 and to undergo other processes described herein. For example, the email account of a potential recipient may be monitored and new email messages treated as information content 24 in accordance with embodiments described herein.

The information content 24 may comprise part of a repository of information content—such as an electronic library. The electronic library may include information content 24 which has been published by one or more authors. The electronic library may comprise information content 24 which has been extracted from non-digital publications (such as books, posters, and the like) and/or digital publications (such as websites, e-books, and the like). The information content 24 may comprise extracts from one or more larger publications.

The repository of information may comprise at least part of a social networking website and information stored in relation thereto. The information content 24 may including postings or updates to a social networking page or pages available through a social networking website.

The repository of information may comprise a repository of information accessible through the internet.

Alternative Feedback Process

A feedback process 15 has been described above. An alternative embodiment of the feedback process 15 is implemented in accordance with embodiments of the invention. This alternative feedback process 15 may be implements by a receiver feedback system (RFS) 18.

This receiver feedback system 18 is capable of handling, in an embodiment, positive and negative feedback and may include a receiver input advanced feedback system and an automatic system for when only limited feedback is given by the recipient 2.

In accordance with an embodiment of the system 18, all keywords (i.e. words or phrases) for each recipient 2 can have three statuses:

(i) Whitelisted—which means that the particular word/phrase will always be included in the receiver release total keyword score 84 where a match exists with a factor equal to, for example, 1.0 applied no matter what the Relevance and Irrelevance Counts relating to this word/phrase (see below).

(ii) Blacklisted—which this means that the particular word/phrase will be excluded from the matching process completely no matter what the Relevance and Irrelevance Counts relating to this word/phrase (see below)

(iii) Default status—which means that the particular word/phrase is included in the matching process and the scoring process but the resulting product of the Release Keyword Score×Receiver Keyword Rank Score for these words is multiplied by a Feedback Likelihood Factor (FLF) that is calculated on the basis discussed below.

By default a predetermined number of the top most highly ranked receiver keywords (i.e. words/phrases with the highest receiver keyword rank scores) are given the whitelisted status (Default Whitelist Words) unless the status is overridden either by applying the blacklisted status or by the recipient 2 changing the status to the Default status. The predetermined number may, for example, be one hundred.

In an embodiment, all words by default start with a Relevance Count of 1 and an Irrelevance Count of 1. The feedback likelihood factor is calculated using the equation shown below:

Feedback Likelihood Factor=Relevance Count/(Relevance Count+Irrelevance Count)  [Equation 16]

In the event that negative feedback is received from a recipient 2 in relation to particular information content 24 sent to that recipient 2 in accordance with embodiments of the invention, the recipient 2 may be directed to an interface which may be a webpage provided over a network (such as the internet).

The interface may present a slider or other user actuatable control or graphical user interface. Instructions on the use of the interface may be provided to the recipient 2. In an embodiment, the recipient is provided with the releases' matched keywords (i.e. words/phrases) ranked in order based on the result of the values of the Release Keyword Score×Receiver Keyword Rank Score match for the information content 24 concerned.

The recipient 2 can choose to flag any of these words/phrases as whitelist or blacklist and/or can change the whitelist status of any words in the list that are currently whitelisted. The status associated with the word/phrase may be altered accordingly.

If a word/phrase which has a Default whitelist status has its status changed by the recipient 2 to the Default status then this word/phrase is, in an embodiment, not automatically whitelisted again by the default process.

All matched words/phrases that relate to the information content 24 concerned have their "Irrelevance Count" increased by 1 even if they are on the Whitelist or Blacklist in case of future need.

The recipient 2 can also review the current Whitelist, Blacklist and Default status lists in full and edit these if desired. A user interface may be provided for this purpose which may be provided as a webpage over a network such as the internet. In an embodiment, the words/phrases are ordered in this interface in descending order of Receiver Keyword Rank Score.

In the event that positive feedback is received from a recipient 2 in relation to particular information content 24 sent to that recipient 2 in accordance with embodiments of the invention, the recipient 2 may be directed to an interface which may be a webpage provided over a network (such as the internet).

The interface may present a slider or other user actuatable control or graphical user interface. Instructions on the use of the interface may be provided to the recipient 2. In an embodiment, the recipient is provided with the releases' matched keywords (i.e. words/phrases) ranked in order based on the result of the values of the Release Keyword Score×Receiver Keyword Rank Score match for the information content 24 concerned.

The recipient 2 can choose to flag any of these words/phrases as whitelist or blacklist and/or can change the whitelist status of any words in the list that currently have the whitelisted status. The status associated with the word/phrase may be altered accordingly.

If a word/phrase which has the Default whitelist status has its status changed by the recipient 2 to the Default status then this word/phrase is, in an embodiment, not automatically whitelisted again by the default process.

All matched words/phrases that relate to the information content 24 concerned have their "Relevance Count" increased by 1 even if they are on the Whitelist or Blacklist in case of future need.

The recipient 2 can also review the current Whitelist, Blacklist and Default status lists in full and edit these if desired. A user interface may be provided for this purpose which may be provided as a webpage over a network such as the internet. In an embodiment, the words/phrases are ordered in this interface in descending order of Receiver Keyword Rank Score.

In accordance with embodiments, the recipient 2 can mark a word/phrase as "Absolute" such that any release (i.e. information content 24) that includes a word/phrase will be received no matter what receiver release total keyword score 84 the information content 24 is given. In an embodiment, the receiver release total keyword score 84 will still be calculated however.

In accordance with embodiments, the recipient 2 can mark a word/phrase as "Very interested" such that the word/phrase will be given a receiver keyword rank score equal to the highest receiver keyword rank score for that recipient 2 and will also be given the Whitelisted status if this is not the current status for that word/phrase. The receiver release keyword score 83 will still, in an embodiment, be calculated though for the word/phrase so that it can revert to this if the status is changed.

Systems and System Components (Such as Modules)

Figure 26:
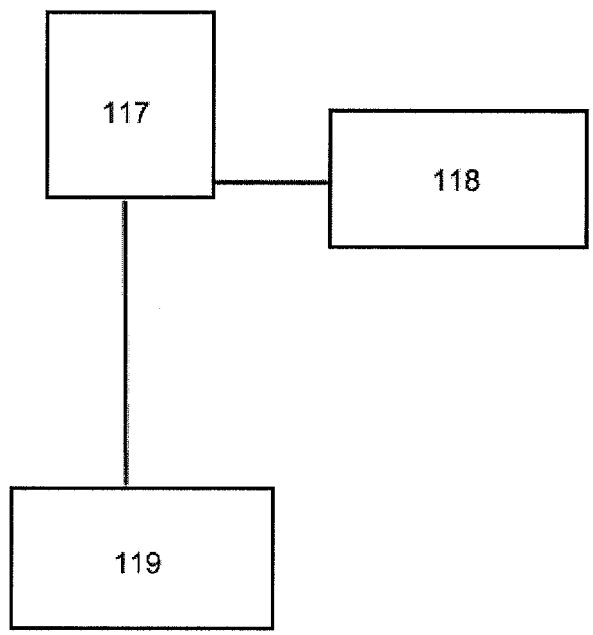
FIG. 26 shows aspects of a computer and network system.

The present invention includes a computer configured to run the above processes (with aspects of manual operation as described where relevant). The computer 117 (see FIG. 26) is, in an embodiment, a dedicated computer 117. The computer 117 may be a computer server. The computer may be connect to a local area network 118 and/or to a wide area network 119.

The computer 117 is preferably configured to run database software such as Microsoft (registered trademark) SQL.

In an embodiment, dedicated computer hardware is configured to perform the above processes.

In an embodiment, a computer readable medium is provided which stores a computer program which, when run on a computer, causes the computer to run one or more of the above described processes.

In an embodiment, a plurality of computers 117 are provided and these are connected to each other through a network which may comprise a local area network 118, a wide area network 119, or a combination thereof. The plurality of computers 117 may carry duplicates of database information held thereon and/or may provide distributed processing power for performing one or more of the above operations.

In an embodiment, the computer 117 is a local personal computer.

Thus, it will be understood, that the above described processes may be run on one or more systems and may form modules or parts of modules. The modules may be synonymous with the processes. A system may be operable to perform any combination of the above processes and may, therefore, include any combination of modules configured to perform the above processes. A system may be a computer 117 or group of computers 117.

It will be appreciated that embodiments of the present invention include various combinations of the above processes. Any combination of processes is possible as an embodiment of the invention and, accordingly, a system may be configured to perform any such combination of processes (or individual process).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An information categorisation system comprising a computer configured to:
   receive location information from a first potential recipient, the location information representing the location of information content generated by the first potential recipient and to passively harvest at least a portion of the information content, the first potential recipient being associated with a first industry category of a plurality of industry categories;
   generate a first recipient profile representing one or more likely interests of the first potential recipient, the one or more likely interests being determined by the passively harvested information content for the first potential recipient, wherein the information content comprises a document which is any of an article, an entry in a RSS feed, a webpage, a status update, a social networking entry, a microblog entry, a blog entry, an email, or published information content;
   generate a second recipient profile representing one or more likely interests of a second potential recipient, the second potential recipient being associated with the first industry category and the second recipient profile being derived from the first recipient profile;

receive an information content profile representative of content of the information content and, in response to receipt of the information content profile, compare the information content profile with the second recipient profile to determine a match indicating that the second potential recipient is likely to be interested in the information content; and categorise the information content into information content for which a match has been determined between the information content profile and the second recipient profile, and information content for which a match has not been determined between the information content profile and the second recipient profile.

2. A system according to claim 1, wherein the computer is further configured to transmit the information content for which a match has been determined between the information content profile and the second recipient profile to the second potential recipient with an indicator indicating that a match was determined.

3. A system according to claim 1, wherein the computer is further configured to transmit only the information content for which a match has been determined between the information content profile and the second recipient profile to the second potential recipient.

4. A system according to claim 1, wherein the computer is further configured to present the information content for which a match has been determined between the information content profile and the second recipient profile to the second potential recipient with an indicator indicating that a match was determined.

5. A system according to claim 1, wherein the computer is further configured to present only the information content for which a match has been determined between the information content profile and the second recipient profile to the second potential recipient.

6. A system according to claim 1, further comprising a database containing a plurality of recipient profiles, each recipient profile representing one or more likely interests of a respective potential recipient, wherein the computer is further configured to:

compare the information content profile with each of the plurality of recipient profiles; and categorise the information content independently for the or each potential recipient whose recipient profile matches the information content profile.

7. A system according to claim 1, wherein the computer is further configured to identify one or more terms and/or phrases in the harvested information content and provide a score for at least one of the terms and/or phrases which is dependent on the frequency of occurrence and location of the term and/or phrase in the harvested information content, the or each score being stored in the first recipient profile with the associated term and/or phrase.

8. A system according to claim 7, wherein the harvested information content comprises a plurality of harvested information content documents and the frequency of occurrence of the term and/or phrase in the harvested information content includes the frequency of occurrence of the term throughout the plurality of harvested information content documents.

9. A system according to claim 7, wherein the computer is further configured to:

receive an information content profile comprising at least one term and/or phrase and an associated score for the or each term and/or phrase; and compare the information content profile score and the recipient profile score for a common term and/or phrase with a threshold value.

10. A system according to claim 1, wherein the computer is further configured to provide the second recipient with an input mechanism to adjust a recipient adjustable relevance threshold, the recipient adjustable relevance threshold being used to determine whether or not a match is sufficient to indicate that the second recipient is likely to be interested in the information content.

11. A system according to claim 1, wherein the computer is further configured to identify one or more terms and/or phrases in the information content and provide a score for at least one of the terms and/or phrases which is dependent on the frequency of occurrence and location of the term and/or phrase in the information content, the or each score being stored in the information content profile with the associated term and/or phrase.

12. A system according to claim 1, wherein the computer is further configured to monitor output information content generated by the second recipient in response to information content for which a match has been determined between the information content profile and the second recipient profile to determine whether the second recipient uses the information content in the generation of output information content.

13. A system according to claim 1, wherein the computer is further configured to compare an industry category of the information content profile with the first industry category of the second recipient profile to determine a match indicating that the second potential recipient is likely to be interested in the information content.

14. A system according to claim 13, wherein the computer is further configured to identify one or more terms and/or phrases in the information content and provide a score for at least one of the terms and/or phrases which is dependent on the frequency of occurrence and location of the term and/or phrase in the information content, the or each score being stored in the information content profile with the associated term and/or phrase.

15. A system according to claim 14, wherein the computer is further configured to:

receive an industry profile comprising at least one term and/or phrase and an associated score for the or each term and/or phrase; and compare the industry profile score and the information content profile score for a common term and/or phrase with a threshold value.

16. A system according to claim 1, wherein the computer is further configured to harvest information content generated by the first potential recipient and output in an information feed associated with the first potential recipient.

17. A system according to claim 1, wherein the computer is further configured to send the information content to the second potential recipient in the event of a match being determined between the information content profile and the second recipient profile by transferring or copying the information content into a first information storage location.

18. A computer implemented method comprising:

receiving location information from a first potential recipient, the location information representing the location of information content generated by the first potential recipient;

passively harvesting at least a portion of the information content generated by the first potential recipient, the first potential recipient being associated with a first industry category of a plurality of industry categories;

generating a first recipient profile representing one or more likely interests of the first potential recipient, the one or more likely interests being determined by the passively harvested information content, wherein the information content comprises a document which is any of an article, an entry in a RSS feed, a webpage, a status update, a social networking entry, a microblog entry, a blog entry, an email, or published information content;

generating a second recipient profile representing one or more likely interests of a second potential recipient, the second potential recipient being associated with the first industry category and the second recipient profile being derived from the first recipient profile;

receiving an information content profile representative of content of the information content and, in response to receipt of the information content profile, comparing the information content profile with the second recipient profile to determine a match indicating that the second potential recipient is likely to be interested in the information content; and categorising the information content into information content for which a match has been determined between the information content profile and the second recipient profile and information content for which a match has not been determined between the information content profile and the second recipient profile.

19. A system configured to generate a recipient profile, the system comprising a processor and a memory including instructions which, when executed by the processor, configure the system to:

receive location information from a first potential recipient, the location information representing the location of information content generated by the first potential recipient and to passively harvest at least a portion of the information content, the first potential recipient being associated with a first industry category of a plurality of industry categories;

generate a first recipient profile representing one or more likely interests of the first potential recipient, the one or more likely interests being determined by the passively harvested information content, wherein the information content comprises a document which is any of an article, an entry in a RSS feed, a webpage, a status update, a social networking entry, a microblog entry, a blog entry, an email, or published information content; and generate a second recipient profile representing one or more likely interests of a second potential recipient, the second potential recipient being associated with the first industry category and the second recipient profile being derived from the first recipient profile.

20. A system according to claim 19, wherein the location information comprises a location of an information feed.

21. A computer implemented method to generate a recipient profile, the method comprising:

receiving location information from a first potential recipient, the location information representing the location of information content generated by the first potential recipient, the first potential recipient being associated with a first industry category of a plurality of industry categories;

passively harvesting at least a portion of the information content;

generating a first recipient profile representing one or more likely interests of the first potential recipient, the one or more likely interests being determined by the passively harvested information content, wherein the information content comprises a document which is any of an article, an entry in a RSS feed, a webpage, a status update, a social networking entry, a microblog entry, a blog entry, an email, or published information content; and generating a second recipient profile representing one or more likely interests of a second potential recipient, the second potential recipient being associated with the first industry category and the second recipient profile being derived from the first recipient profile.

* * * * *